United States Patent
Raghupathy et al.

(10) Patent No.: US 9,035,829 B2
(45) Date of Patent: May 19, 2015

(54) WIDE AREA POSITIONING SYSTEMS AND METHODS

(75) Inventors: Arun Raghupathy, Bangalore (IN); Andrew Sendonaris, Los Gatos, CA (US); Norman F. Krasner, Emerald Hills, CA (US)

(73) Assignee: NextNav, LLC, Sunnyvale, CA (US)

( * ) Notice: Subject to any disclaimer, the term of this patent is extended or adjusted under 35 U.S.C. 154(b) by 366 days.

(21) Appl. No.: 13/535,128

(22) Filed: Jun. 27, 2012

(65) Prior Publication Data

US 2013/0169484 A1    Jul. 4, 2013

Related U.S. Application Data

(63) Continuation-in-part of application No. 13/412,487, filed on Mar. 5, 2012, now Pat. No. 8,629,803, which is a continuation of application No. 12/557,479, filed on Sep. 10, 2009, now Pat. No. 8,130,141.

(Continued)

(51) Int. Cl.
*G01S 1/08*   (2006.01)
*G01S 5/02*   (2010.01)
*G01S 19/11*  (2010.01)
*G01S 19/46*  (2010.01)

(52) U.S. Cl.
CPC ............. *G01S 5/0226* (2013.01); *G01S 19/11* (2013.01); *G01S 19/46* (2013.01)

(58) Field of Classification Search
USPC .................................. 342/386, 412, 450, 451
See application file for complete search history.

(56) References Cited

U.S. PATENT DOCUMENTS

| | | | |
|---|---|---|---|
| 5,327,144 A | | 7/1994 | Stilp |
| 5,406,091 A | | 4/1995 | Burba |
| 5,416,800 A | | 5/1995 | Frank |
| 5,600,706 A | * | 2/1997 | Dunn et al. ............... 455/456.2 |
| 5,604,765 A | | 2/1997 | Bruno |
| 5,652,592 A | | 7/1997 | Sanderford et al. |

(Continued)

FOREIGN PATENT DOCUMENTS

| | | |
|---|---|---|
| DE | 10107133 A1 | 8/2002 |
| JP | 2008-51808 A | 3/2008 |

(Continued)

OTHER PUBLICATIONS

Form PCT/ISA/220, PCT/US2009/056572, "Notification of Transmittal of the International Search Report and the Written Opinion of the International Searching Authority, or the Declaration", 1 pages; Form PCT/ISA/210, PCT/US2009/056572, "International Search Report", 2 pages; Form PCT/ISA/237, PCT/US2009/056572, "Written Opinion of the International Searching Authority", 3 pages.

(Continued)

*Primary Examiner* — Harry Liu

(57) ABSTRACT

Devices, systems, and methods for sending positional information from transmitters/beacons are disclosed. In one implementation a transmitter generates a range block including a ranging signal and a hybrid block including positioning data, and sends the range block and hybrid block in predefined slots in a transmit frame. A receiver in a user device receives signals from a plurality of transmitters and generates position/location information using trilateration and measured altitude information in comparison with transmitter altitude information.

62 Claims, 22 Drawing Sheets

Example Location/Position System Embodiment

Related U.S. Application Data

(60) Provisional application No. 61/163,020, filed on Mar. 24, 2009, provisional application No. 61/095,856, filed on Sep. 10, 2008, provisional application No. 61/502,272, filed on Jun. 28, 2001, provisional application No. 61/502,276, filed on Jun. 28, 2011, provisional application No. 61/514,369, filed on Aug. 2, 2011.

(56) References Cited

U.S. PATENT DOCUMENTS

| | | | |
|---|---|---|---|
| 5,754,657 | A | 5/1998 | Schipper |
| 5,758,288 | A | 5/1998 | Atherly |
| 5,822,363 | A | 10/1998 | Leroy |
| 5,912,644 | A | 6/1999 | Want |
| 5,924,037 | A | 7/1999 | Mao |
| 5,956,338 | A * | 9/1999 | Ghaibeh .................. 370/236.2 |
| 5,959,580 | A | 9/1999 | Maloney |
| 5,999,124 | A | 12/1999 | Sheynblat |
| 6,094,168 | A | 7/2000 | Duffet-Smith |
| 6,097,336 | A | 8/2000 | Stilp |
| 6,101,178 | A | 8/2000 | Beal |
| 6,127,975 | A | 10/2000 | Maloney |
| 6,160,837 | A | 12/2000 | Bruno |
| 6,172,644 | B1 | 1/2001 | Stilp |
| 6,184,829 | B1 | 2/2001 | Stilp |
| 6,201,803 | B1 | 3/2001 | Munday |
| 6,266,013 | B1 | 7/2001 | Stilp |
| 6,275,705 | B1 | 8/2001 | Drane |
| 6,285,321 | B1 | 9/2001 | Stilp |
| 6,288,675 | B1 | 9/2001 | Maloney |
| 6,288,676 | B1 | 9/2001 | Maloney |
| 6,317,081 | B1 | 11/2001 | Stilp |
| 6,342,854 | B1 | 1/2002 | Duffet-Smith |
| 6,353,390 | B1 | 3/2002 | Beri |
| 6,366,241 | B2 | 4/2002 | Pack |
| 6,400,320 | B1 | 6/2002 | Stilp |
| 6,433,739 | B1 | 8/2002 | Soliman |
| 6,483,460 | B2 | 11/2002 | Stilp |
| 6,518,918 | B1 | 2/2003 | Vannucci et al. |
| 6,522,890 | B2 | 2/2003 | Drane |
| 6,525,688 | B2 | 2/2003 | Chou |
| 6,529,165 | B1 | 3/2003 | Duffet-Smith |
| 6,559,800 | B2 | 5/2003 | Rabinowitz |
| 6,603,428 | B2 | 8/2003 | Stilp |
| 6,661,379 | B2 | 12/2003 | Stilp |
| 6,665,541 | B1 | 12/2003 | Kranser |
| 6,735,542 | B1 | 5/2004 | Burgett et al. |
| 6,741,578 | B1 | 5/2004 | Moon |
| 6,771,625 | B1 | 8/2004 | Beal |
| 6,782,264 | B2 | 8/2004 | Anderson |
| 6,831,943 | B1 | 12/2004 | Dabak |
| 6,865,394 | B2 | 3/2005 | Ogino |
| 6,873,290 | B2 | 3/2005 | Anderson |
| 6,876,859 | B2 | 4/2005 | Anderson |
| 6,894,644 | B2 | 5/2005 | Duffet-Smith |
| 6,900,758 | B1 | 5/2005 | Mann |
| 6,937,866 | B2 | 8/2005 | Duffet-Smith |
| 6,959,032 | B1 | 10/2005 | Richards |
| 6,996,392 | B2 | 2/2006 | Anderson |
| 6,999,780 | B1 | 2/2006 | Zhao |
| 7,006,834 | B2 | 2/2006 | Gaal |
| 7,023,383 | B2 | 4/2006 | Stilp |
| 7,031,722 | B2 | 4/2006 | Naghian |
| 7,126,527 | B1 | 10/2006 | Bajikar |
| 7,126,536 | B2 | 10/2006 | Rabinowitz et al. |
| 7,167,713 | B2 | 1/2007 | Anderson |
| 7,203,499 | B2 | 4/2007 | Wigren |
| 7,251,562 | B1 | 7/2007 | Brodie |
| 7,260,407 | B2 | 8/2007 | Duffet-Smith |
| 7,271,765 | B2 | 9/2007 | Stilp |
| 7,315,745 | B2 | 1/2008 | Duffet-Smith |
| 7,327,310 | B2 | 2/2008 | Abraham |
| 7,340,259 | B2 | 3/2008 | Maloney |
| 7,359,719 | B1 | 4/2008 | Duffet-Smith |
| 7,423,580 | B2 | 9/2008 | Markhovsky |
| 7,433,321 | B2 | 10/2008 | Grilli |
| 7,508,883 | B2 | 3/2009 | Duffet-Smith |
| 7,561,048 | B2 | 7/2009 | Yushkov et al. |
| 7,593,736 | B1 | 9/2009 | Duffet-Smith |
| 7,616,155 | B2 | 11/2009 | Bull |
| 7,636,061 | B1 | 12/2009 | Thomas |
| 7,639,179 | B2 | 12/2009 | Hansen |
| 7,652,622 | B2 | 1/2010 | Hansen |
| 7,652,625 | B2 * | 1/2010 | Small .......................... 342/386 |
| 7,706,328 | B2 | 4/2010 | Mukkavilli |
| 7,706,754 | B2 | 4/2010 | Krasner |
| 7,751,949 | B2 | 7/2010 | Alanen et al. |
| 7,760,132 | B1 | 7/2010 | Markhovsky |
| 7,783,299 | B2 | 8/2010 | Anderson |
| 7,787,886 | B2 | 8/2010 | Markhovsky |
| 7,796,549 | B2 | 9/2010 | Grilli |
| 7,797,000 | B2 | 9/2010 | Anderson |
| 7,804,448 | B2 | 9/2010 | Bull |
| 7,822,424 | B2 | 10/2010 | Markhovsky |
| 7,826,343 | B2 | 11/2010 | Krasner |
| 7,832,126 | B2 * | 11/2010 | Koellner et al. ................ 37/348 |
| 7,852,267 | B2 | 12/2010 | Duffet-Smith |
| 7,872,583 | B1 | 1/2011 | Markhovsky et al. |
| 7,876,265 | B2 | 1/2011 | Black |
| 7,893,873 | B2 | 2/2011 | Black |
| 7,903,633 | B2 | 3/2011 | Grilli |
| 7,911,988 | B2 | 3/2011 | Riley |
| 7,912,057 | B2 | 3/2011 | Petry |
| 7,956,804 | B2 | 6/2011 | Jin |
| 7,961,717 | B2 | 6/2011 | Lee et al. |
| 7,962,162 | B2 | 6/2011 | McNair |
| 7,969,311 | B2 | 6/2011 | Markhovsky et al. |
| 7,978,136 | B2 | 7/2011 | Duffet-Smith |
| 8,013,788 | B2 | 9/2011 | Duffet-Smith |
| 8,041,505 | B2 | 10/2011 | Pierce |
| 8,050,687 | B2 | 11/2011 | Duffet-Smith |
| 8,059,028 | B2 | 11/2011 | Boyer et al. |
| 8,102,317 | B2 | 1/2012 | Lee |
| 8,103,294 | B2 | 1/2012 | Duffet-Smith |
| 8,106,828 | B1 | 1/2012 | Do |
| 8,109,168 | B2 | 2/2012 | Wurm |
| 8,130,141 | B2 | 3/2012 | Pattabiraman et al. |
| 8,150,415 | B2 | 4/2012 | Kim et al. |
| 8,154,442 | B2 | 4/2012 | Alanen et al. |
| 8,160,610 | B2 | 4/2012 | Harper et al. |
| 8,165,064 | B2 | 4/2012 | Mukkavilli |
| 8,233,091 | B1 | 7/2012 | Rabinowitz |
| 8,233,911 | B2 | 7/2012 | Charbit et al. |
| 8,242,959 | B2 | 8/2012 | Mia et al. |
| 8,243,712 | B2 | 8/2012 | Krasner |
| 8,244,275 | B2 | 8/2012 | Islam |
| 8,249,619 | B2 | 8/2012 | Kong |
| 8,253,628 | B2 | 8/2012 | Duffet-Smith |
| 8,255,160 | B2 | 8/2012 | Duffet-Smith |
| 8,279,116 | B2 | 10/2012 | Duffet-Smith |
| 8,295,853 | B2 | 10/2012 | Heikkila |
| 8,305,215 | B2 | 11/2012 | Markhovsky |
| 8,306,523 | B2 | 11/2012 | Fischer |
| 8,306,676 | B1 | 11/2012 | Ingvalson et al. |
| 8,325,661 | B2 | 12/2012 | Montojo |
| 8,335,522 | B2 | 12/2012 | Mate et al. |
| 8,390,512 | B2 | 3/2013 | Ische |
| 8,401,033 | B2 | 3/2013 | Palanki |
| 8,401,111 | B2 | 3/2013 | Sampath |
| 8,401,570 | B2 | 3/2013 | Wigren et al. |
| 8,412,227 | B2 | 4/2013 | Edge |
| 8,412,239 | B1 | 4/2013 | Palanki |
| 8,472,971 | B2 | 6/2013 | Rowe |
| 8,489,124 | B2 | 7/2013 | Mukkavilli |
| 2002/0087628 | A1 | 7/2002 | Rouse |
| 2002/0181565 | A1 | 12/2002 | Boyd |
| 2003/0174090 | A1 | 9/2003 | Spilker |
| 2004/0180669 | A1 | 9/2004 | Kall |
| 2004/0242205 | A1 | 12/2004 | Yamane |
| 2005/0052318 | A1 | 3/2005 | Jendbro |
| 2005/0058058 | A1 * | 3/2005 | Cho et al. ...................... 370/208 |
| 2005/0078032 | A1 | 4/2005 | Gilkes |

(56) References Cited

U.S. PATENT DOCUMENTS

| | | |
|---|---|---|
| 2005/0176441 A1 | 8/2005 | Jurecka |
| 2005/0228613 A1 | 10/2005 | Fullerton |
| 2005/0254558 A1 | 11/2005 | Dutka |
| 2005/0278120 A1 | 12/2005 | Manfred |
| 2005/0285790 A1 | 12/2005 | Gagnon |
| 2006/0111840 A1 | 5/2006 | Van Diggelen |
| 2007/0013584 A1 | 1/2007 | Camp |
| 2007/0016346 A1 | 1/2007 | Alanen |
| 2007/0030841 A1 | 2/2007 | Lee |
| 2007/0058591 A1* | 3/2007 | Lamance et al. ............. 370/335 |
| 2007/0063896 A1 | 3/2007 | Alban |
| 2007/0133391 A1 | 6/2007 | Roh |
| 2007/0142013 A1 | 6/2007 | Bucknor |
| 2007/0157283 A1 | 7/2007 | Setlur |
| 2007/0168124 A1 | 7/2007 | Dossas |
| 2007/0218823 A1 | 9/2007 | Wolf |
| 2008/0022352 A1 | 1/2008 | Seo |
| 2008/0032706 A1 | 2/2008 | Sheynblat |
| 2008/0166974 A1 | 7/2008 | Teo |
| 2008/0280624 A1* | 11/2008 | Wrappe ..................... 455/456.1 |
| 2008/0304520 A1 | 12/2008 | Hannuksela |
| 2008/0309557 A1 | 12/2008 | Mailaender |
| 2009/0121927 A1 | 5/2009 | Moshfeghi |
| 2009/0146871 A1 | 6/2009 | Abraham et al. |
| 2009/0196177 A1 | 8/2009 | Teyeb |
| 2009/0225816 A1 | 9/2009 | Cheng |
| 2009/0256750 A1 | 10/2009 | Mathews |
| 2009/0286556 A1 | 11/2009 | Yumoto |
| 2010/0039316 A1 | 2/2010 | Gronemeyer |
| 2010/0049469 A1 | 2/2010 | Wirola et al. |
| 2010/0073229 A1 | 3/2010 | Pattabiraman |
| 2010/0130229 A1 | 5/2010 | Sridhara et al. |
| 2010/0204916 A1 | 8/2010 | Garin |
| 2010/0250134 A1 | 9/2010 | Bornstein et al. |
| 2010/0260154 A1 | 10/2010 | Frank et al. |
| 2010/0309057 A1 | 12/2010 | Edge et al. |
| 2011/0057836 A1 | 3/2011 | Ische et al. |
| 2011/0227790 A1 | 9/2011 | Li |
| 2011/0317613 A1 | 12/2011 | Gerstenberger et al. |
| 2012/0013475 A1 | 1/2012 | Farley et al. |
| 2012/0027110 A1 | 2/2012 | Han et al. |
| 2012/0072110 A1 | 3/2012 | Venkatraman |
| 2012/0122478 A1 | 5/2012 | Siomina et al. |
| 2012/0182180 A1 | 7/2012 | Wolf |
| 2012/0290253 A1 | 11/2012 | Barrett et al. |
| 2012/0316831 A1 | 12/2012 | Klinghult |
| 2013/0023285 A1 | 1/2013 | Markhovsky et al. |
| 2013/0033999 A1 | 2/2013 | Siomina et al. |
| 2013/0045759 A1 | 2/2013 | Smith |
| 2013/0057434 A1 | 3/2013 | Krasner |
| 2013/0057436 A1 | 3/2013 | Krasner |
| 2013/0063302 A1 | 3/2013 | Krasner |
| 2013/0063307 A1 | 3/2013 | Krasner |
| 2013/0063308 A1 | 3/2013 | Krasner |
| 2013/0122930 A1 | 5/2013 | Woo et al. |
| 2013/0169484 A1 | 7/2013 | Raghupathy |
| 2013/0252629 A1 | 9/2013 | Wigren et al. |
| 2013/0271324 A1 | 10/2013 | Sendonaris et al. |

FOREIGN PATENT DOCUMENTS

| | | |
|---|---|---|
| WO | WO 2007011334 A1 | 1/2007 |
| WO | WO 2007096683 A1 | 8/2007 |
| WO | WO 2008069712 A1 | 6/2008 |
| WO | WO 2010/030825 A1 | 3/2010 |
| WO | WO 2010030825 A1 | 3/2010 |
| WO | WO2011019357 A1 | 2/2011 |
| WO | WO 2011020083 A1 | 2/2011 |
| WO | WO 2012065184 A2 | 5/2012 |
| WO | WO 2013003492 A1 | 1/2013 |
| WO | WO 2013003636 A2 | 1/2013 |
| WO | WO 2013019986 A1 | 2/2013 |

OTHER PUBLICATIONS

Form PCT/ISA/220, PCT/US2011/060655, "Notification of Transmittal of the International Search Report and the Written Opinion of the International Searching Authority, or the Declaration", 1 pages; Form PCT/ISA/210, PCT/US2011/060655, "International Search Report", 6 pages; Form PCT/ISA/237, PCT/US2011/060655, "Written Opinion of the International Searching Authority", 22 pages.

Form PCT/ISA/220, PCT/US2012/044452, "Notification of Transmittal of the International Search Report and the Written Opinion of the International Searching Authority, or the Declaration", 1 page; Form PCT/ISA/210, PCT/US2012/044452, "International Search Report", 5 pages; Form PCT/ISA/237, PCT/US2012/044452, "Written Opinion of the International Searching Authority", 10 pages.

Form PCT/ISA/220, PCT/US2012/049390, "Notification of Transmittal of the International Search Report and the Written Opinion of the International Searching Authority, or the Declaration", 1 pages; Form PCT/ISA/210, PCT/US2012/049390, "International Search Report", 2 pages; Form PCT/ISA/237, PCT/US2012/049390, "Written Opinion of the International Searching Authority", 15 pages.

Form PCT/ISA/220, PCT/US2012/044719, "Notification of Transmittal of the International Search Report and the Written Opinion of the International Searching Authority, or the Declaration", 1 page; Form PCT/ISA/210, PCT/US2012/044719, "International Search Report", 2 pages.

Form PCT/ISA/206, PCT/US2013/036634, "Invitation to Pay Additional Fees and, Where Applicable, Protest Fee", 5 pages.

Form PCT/ISA/220, PCT/US2013/036634, "Notification of Transmittal of the International Search Report and the Written Opinion of the International Searching Authority, or the Declaration", 1 page; Form PCT/ISA/210, PCT/US2013/036634, "International Search Report", 7 pages; Form PCT/ISA/237, PCT/US2013/036634, "Written Opinion of the International Searching Authority", 11 pages.

"Extended GPS Navigation Bits Message", 3GPP2 Draft; C16-20040112-005 QCOM NAV BIT MSG, $3^{rd}$ Generation Partnership Project 2, 3GPP2, 2500 Wilson Boulevard, Suite 300, Arlington, Virginia 22201, vol. TSGC, Jan. 16, 2004, XP062049825.

"Digital cellular telecommunications system (Phase 2+); Location Services (LCS); Mobile Station (MS)—Serving Mobile Location Center (SMLC) Radio Resource LCS Protocol (RRLP) (3GPP TS 44.031 version 10.0.0 Release 10", Technical Specification, European Telecommunications Standards Institute (ETSI), 650, Route Des Lucioles; F-06921 Sophia-Antipolis; France, vol. 3GPP Geran 2, No. V 10.0.0, May 1, 2011, XP014066483.

Form PCT/ISA/220, PCT/US2013/044147, "Notification of Transmittal of the International Search Report and the Written Opinion of the International Searching Authority, or the Declaration", 1 page; Form PCT/ISA/210, PCT/ US2013/044147, "International Search Report", 4 pages; Form PCT/ISA/237, PCT/ US2013/044147, "Written Opinion of the International Searching Authority", 8 pages.

Form PCT/ISA/220, PCT/US2012/044452, "Notification of Transmittal of the International Search Report and the Written Opinion of the International Searching Authority, or the Declaration", 1 pg.; Form PCT/ISA/210, PCT/US2012/044452, "International Search Report", 5 pgs.; Form PCT/ISA/237, PCT/US2012/044452, "Written Opinion of the International Searching Authority", 10 pgs.

B.W. Parkinson, J.J. Spilker: "The Global Positioning System: Theory and Applications, vol. 1", Jan. 1, 1996, American Institute of Aeronautics and Astronautics, Cambridge Massachusetts, XP002686935, pp. 121-133, the whole document.

* cited by examiner

Example Location/Position System Embodiment

Example Location/Position Transmitter System Embodiment

Example Location/Position User Device (Receiver)

Example Single Transmitter Output Signal Block Structure with Range and One or More Hybrid Blocks
(Not to Scale)

Example Frame Structure with N Slots

Example Slot Data Formatting Structure

Example Slot Configuration and Timing in An Exemplary Embodiment
(Not Necessarily to Scale)

Example Signaling Embodiment with Synchronized Transmitter Block Type

Example Signaling Embodiment with Staggered Transmitter Block Type

900

| Range Preamble | Range Pilot | Guard (Optional) |
|---|---|---|
| 910 | 920 | 930 |

FIG. 9

*Example Transmitter Range Block Configuration*
*(Not Necessarily to Scale)*

1000

| Hybrid Preamble | Hybrid Pilot and Data | Guard (Optional) |
|---|---|---|
| 1010 | 1020 | 1030 |

*Hybrid Preamble typically Shorter Than Range Preamble*

FIG. 10

*Example Hybrid Block Configuration*
*(Not Necessarily to Scale)*

1100

| Hybrid Preamble | Additional Preamble |
|---|---|
| 1110 | 1120 |

FIG. 11

*Example Range Preamble Configuration*
*(Not Necessarily to Scale)*

One Embodiment of Transmit Output Signal Generation Process for Single Transmitter One Embodiment of Transmit Output Signal Generation Process for Multiple Transmitters (Two Transmitters Illustrated)

One Embodiment of a Transmit Output Signal Generation Process for Sending Temporally Distributed Resolution (TDR) Data

| Quantity | Num bits | Accuracy | Reduced bits | Reduced accuracy |
|---|---|---|---|---|
| Latitude | 28 | ~0.1m | 26 | 0.4m |
| Longitude | 29 | ~0.1m | 27 | 0.4m |
| Altitude | 18 | ~0.06m | 16 | 0.25m |
| Temperature | 9 | < ~1m vertical | 9 | 1m vertical |
| Pressure | 13 | ~0.25m vertical | 12 | 0.5m vertical |
| Tx Correction | 5 | 0.3m | 5 | 0.3m |
| Tx quality | 3 | N/A | 3 | N/A |
| Packet type index | 4 | N/A | 3 | N/A |
| Total | 109 | | 102 | |

FIG. 15A

*Example Embodiment of Triangulation Data That May be Sent Using Temporally Distributed Resolution*

| Quantity | Num bits | Resolution | Reduced bits | Reduced resolution |
|---|---|---|---|---|
| Latitude | 28 | $1/2^{20}$ degrees (~0.1m) | 25 | 0.8m |
| Longitude | 29 | $1/2^{20}$ degrees (~0.1m) | 26 | 0.8m |
| Altitude | 18 | ~0.06m | 14 | 1m |
| Temperature | 9 | ¼ Kelvin (< ~1m in most cases) | 9 | 1m |
| Pressure | 13 | 1 PA (~0.25m) | 11 | 1m |
| Tx Correction | 6 | 0.3m | 5 | 0.6m |
| Tx quality | 3 | N/A | 1 | N/A |
| Framing overhead | 3 | N/A | 3 | N/A |
| Total | 109 | | 94 | |

FIG. 15B

*Another Example Embodiment of Triangulation Data That May be Sent Using Temporally Distributed Resolution*

1500B

1600

| Tx period | 1 | 2 | 3 | 4 | 5 | 6 | 7 | 8 | 9 | 10 |
|---|---|---|---|---|---|---|---|---|---|---|
| Tx info | 523 | 523 | 523 | 524 | 523 | 523 | 523 | 524 | 523 | 523 |

FIG. 16

*Example Transmitted Lowered Resolution Data*

1700

| Tx period | 1 | 2 | 3 | 4 | 5 | 6 | 7 | 8 | 9 | 10 |
|---|---|---|---|---|---|---|---|---|---|---|
| Tx info | 523 | 523 | 523 | 524 | 523 | 523 | 523 | 524 | 523 | 523 |
| Est value (cm) | 5230 | 5230 | 5230 | 5233 | 5232 | 5232 | 5231 | 5233 | 5232 | 5232 |
| Error (cm) | -2 | -2 | -2 | 1 | 0 | 0 | -1 | 1 | 0 | 0 |

FIG. 17

*Example Higher Resolution Data Estimate at Receiver/User Device (Over Time)*

One Embodiment of Processing of a DataBurst Transmitter Output Signal at a Receiver/User Device to Determine Location Information One Embodiment of Processing of a DataBurst Temporally Distributed Resolution (TDR) Signal at a Receiver/User Device

| Type | Payload | Number of bits | Number of slots |
|---|---|---|---|
| 0 | Lat, long, alt, pressure, temp, tx_correction, tx_quality (encrypted) | 98 | 2 |
| 1 | Lat, long, alt, pressure, temp, tx_correction, tx_quality (unencrypted) | 98 | 2 |
| 2 | TxID, pressure, temperature, tx_correction, <extra_info> | 95 (42 for trilateration info, 53 for extra info) | 2 |
| 3 | GPS_time, GPS_time_offset, slot_idx, <extra_info> | 95 (43 for GPS time info, 52 for extra info) | 2 |
| 4 | Security info | 95 | 2 |
| 5 | Service ID, Conditional Access payload | 95 | 2 |

Example Data Packet Types in Accordance with One Embodiment

Example Data Packet Types in Accordance with One Embodiment

Example Convolutional Encoder

One Embodiment of a Circuit for Generating a DataBurst Transmitter Output Signal in a Transmitter

WIDE AREA POSITIONING SYSTEMS AND METHODS

CROSS-REFERENCE TO RELATED APPLICATIONS

This application is a Continuation in Part (CIP) of and claims priority to United States Utility patent application Ser. No. 13/412,487, entitled WIDE AREA POSITIONING SYSTEMS, filed on Mar. 5, 2012, which is a Continuation of U.S. Utility patent Ser. No. 12/557,479 (now U.S. Pat. No. 8,130, 141), entitled WIDE AREA POSITIONING SYSTEM, filed Sep. 10, 2009, which claims priority to U.S. Provisional Patent Application Ser. No. 61/163,020, entitled WIDE AREA POSITIONING SYSTEM, filed Mar. 24, 2009, and to U.S. Provisional Patent Application Ser. No. 61/095,856, entitled WIDE AREA POSITIONING SYSTEM, filed Sep. 10, 2008. This application also claims priority under 35 U.S.C. 35 U.S.C. 119(e) to U.S. Provisional Patent Application Ser. No. 61/502,272, entitled DATA TRANSMISSION METHODS IN WIDE AREA POSITIONING SYSTEMS (WAPS), filed Jun. 28, 2011, to U.S. Provisional Patent Application Ser. No. 61/502,276, entitled CODING IN WIDE AREA POSITIONING SYSTEMS, filed Jun. 28, 2011, and to U.S. Provisional Patent Application Ser. No. 61/514,369, entitled CELL ORGANIZATION AND TRANSMISSION SCHEMES IN A WIDE AREA POSITIONING SYSTEM (WAPS), filed Aug. 2, 2011. The content of each of these applications is incorporated by reference herein in it is entirety for all purposes.

FIELD

This disclosure relates generally to positioning systems. More specifically, but not exclusively, the disclosure relates to devices, systems, and methods for providing signaling for position determination and determining high accuracy position/location information using a wide area transmitter array in communication with receivers and processing elements in user devices or terminals (UEs) such as in cellular phones or other portable devices.

BACKGROUND

Systems for providing position information are known in the art. For example, radio-bases systems such as LORAN, GPS, GLONASS, and the like have been used to provide position information for persons, vehicles, equipment, and the like. These systems do, however, have limitations associated with factors such as location accuracy, transmitted and received signal levels, radio channel interference and/or channel problems such as multipath, device power consumption, and the like. Accordingly, there is a need for improved positioning systems to address these and/or other problems with existing positioning systems and devices.

SUMMARY

This disclosure relates generally to positioning systems. More specifically, but not exclusively, the disclosure relates to devices, systems, and methods for providing signaling for position determination and determining high accuracy position/location information using a wide area transmitter array in communication with receivers and processing elements in user devices or terminals (UEs) such as in cellular phones or other portable devices.

For example, in one aspect, the disclosure relates to a method of providing positioning system information, such as in a Wide Area Position Systems (WAPS) or other similar or equivalent system, by sending signals from ones of a plurality of transmitters to one or more receivers/user devices. The method may include, for example, generating, at a transmitter, a range block including a ranging signal. The method may further include sending, from the transmitter, the range block. The range block may be sent in a predefined slot of a plurality of predefined slots comprising a first transmit frame. The method may further include generating, at the transmitter, a hybrid block. The hybrid block may include data or information, such as a positioning signal including positioning data. The method may further include sending, from the transmitter, the hybrid block. The hybrid block may be sent in the predefined slot in a second transmit frame disjoint from the first transmit frame. The hybrid block may further other information or signaling, such as a ranging signal.

In another aspect, the disclosure relates to devices and systems for implementing the above-described methods, in whole or in part.

In another aspect, the disclosure relates to means to implement the above-described methods, in whole or in part.

In another aspect, the disclosure relates to computer readable media including instructions to cause a programmable device such as a computer processor to implement or control the above-described methods, in whole or in part.

Various additional aspects, features, and functions are described below in conjunction with the appended Drawings.

BRIEF DESCRIPTION OF THE DRAWINGS

The present application may be more fully appreciated in connection with the following detailed description taken in conjunction with the accompanying drawings, wherein:

FIG. 9 illustrates details of one embodiment of a range block structire in accordance with certain aspects;

FIG. 10 illustrates details of one embodiment of a hybrid block structure in accordance with certain aspects;

FIG. 11 illustrates details of one embodiment of a range preamble structure in accordance with certain aspects;

FIG. 15A illustrates details of one embodiment of example trilateration data that may be sent using TDR signaling;

FIG. 15B illustrated another embodiment of example trilateration data that may be sent using TDR signaling;

FIG. 16 illustrates example data timing and resolution of transmitted signals in one embodiment of TDR signaling;

FIG. 17 illustrates example higher resolution data processing based on received TDR signals;

FIG. 20 illustrates details of one embodiment data packets that may be used in an exemplary embodiment;

DETAILED DESCRIPTION

Terminology

Figure 1:
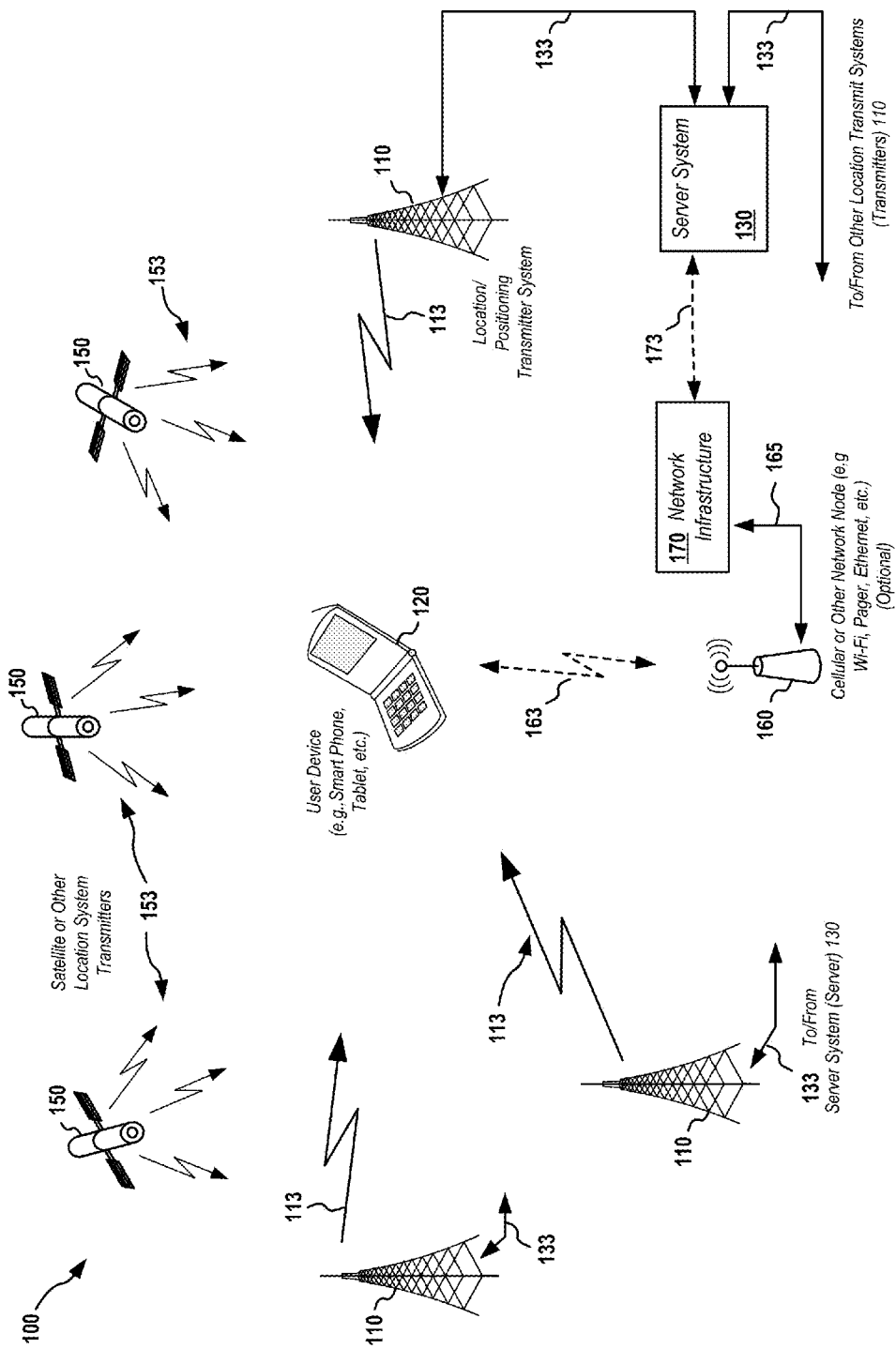
FIG. 1 is a block diagram illustrating details of a terrestrial location/positioning system on which embodiments may be implemented.

Frame—as used herein, the term "frame" or "transmit frame" refers to a recurring time window in which signals may be sent from a transmitter. A frame repeats at a recurring time interval and may be subdivided into slots. In typical embodiments a frame may be periodic, but may also be aperiodic in some embodiments.

Slot—as used herein, the term "slot" refers to a time window within a frame that is typically a fraction of the frame. For example, a frame may be of one second duration and have 10 slots, resulting in each slot having an index within the frame (e.g., slot 1, slot, 2, . . . slot 10), and a time duration (e.g., 100 mS).

As used herein, the term "block" refers to a discrete unit of a transmitter output signal that may include a ranging signaling component and may further include a data signaling component, both of which are sent in a particular slot, which is typically predefined for the transmitter.

As used herein, the term "exemplary" means serving as an example, instance or illustration. Any aspect and/or embodiment described herein as "exemplary" is not necessarily to be construed as preferred or advantageous over other aspects and/or embodiments.

Overview

This disclosure relates generally to positioning systems. More specifically, but not exclusively, the disclosure relates to devices, systems, and methods for providing signaling for position determination and determining high accuracy position/location information using a wide area transmitter array in communication with receivers and processing elements in user devices or terminals (UEs) such as in cellular phones or other portable devices.

For example, in one aspect, the disclosure relates to a method of providing positioning system information, such as in a WAPS or other similar system. The method may include, for example, generating, at a transmitter, a range block including a ranging signal. The method may further include sending, from the transmitter, the range block. The range block may be sent in a predefined slot of a plurality of predefined slots comprising a first transmit frame. The method may further include generating, at the transmitter, a hybrid block. The hybrid block may include data or information, such as a positioning signal including positioning data. The method may further include sending, from the transmitter, the hybrid block. The hybrid block may be sent in the predefined slot in a second transmit frame disjoint from the first transmit frame. The hybrid block may further other information or signaling, such as a ranging signal.

The method may further include, for example, generating, at the transmitter, a second hybrid block, and sending, from the transmitter, the second hybrid block. The second hybrid block may be sent in the predefined slot in a third transmit frame disjoint from the first and/or second transmit frames. The method may further include generating, at a second transmitter, a range block including a ranging signal. The method may further include sending, from the second transmitter, the range block. The range block may be sent from the second transmitter in a second predefined slot of the plurality of predefined slots. The method may further include generating, at the second transmitter, a hybrid block. The hybrid block may include data such as a positioning signal including positioning data and/or other data or signaling. The method may further include sending, from the second transmitter, the hybrid block. The hybrid block may be sent in the second predefined slot of the plurality of predefined slots in a transmit frame disjoint from the first transmit frame. The hybrid block generated at the second transmitter may further include a ranging signal. The method may further include generating, at the second transmitter, a second hybrid block, and sending, from the second transmitter, the second hybrid block. The second hybrid block may be sent from the second transmitter in the second predefined slot in a transmit frame disjoint from the first transmit frame.

The predefined slot may, for example, be the same as the second predefined slot or may be different from the second predefined slot. The ranging signal sent from the transmitter may include a first random pseudo-noise (PRN) sequence and the ranging signal sent from the second transmitter may include a second PRN sequence. The first PRN sequence may be the same as, or different than, the second PRN sequence. The ranging signal sent from the transmitter may have a first frequency offset and the ranging signal sent from the second transmitter may have a second frequency offset. The first frequency offset may be the same as or different from the second frequency offset. The range block sent from the second transmitter may be sent in the first transmit frame.

The range block sent from the transmitter may include, for example, a range preamble signal and a range pilot signal. The range block sent from the transmitter may include a guard signal. The guard signal may include a gold code sequence. The guard signal may include a blank or off signal or signal component. The hybrid block sent from the transmitter may include a hybrid preamble signal, and the range preamble signal includes the hybrid preamble signal and an additional preamble signal. The hybrid block sent from the transmitter may include a hybrid preamble signal and a first set of data. The hybrid block sent from the transmitter may further include a hybrid pilot signal. The range preamble signal may be sent with a first transmit frequency offset, and the range pilot signal may be sent with a second transmit frequency offset different from the first transmit frequency offset. The hybrid preamble signal may be sent with a first transmit frequency offset, and the first set of data may be sent with a second transmit frequency offset. The first transmit frequency offset may be different from the second transmit frequency offset.

The hybrid block sent from the transmitter may include, for example, data associated with a location or position of the transmitter. The data associated with a location of the transmitter may include latitude and/or longitude data, and/or other position or location data. The data associated with the location of the transmitter may include transmitter identification information, such as transmitter ID or other identification information. The data associated with the location of the transmitter may include altitude information.

The hybrid block sent from the transmitter may include, for example, data associated with an environmental condition at or in the proximity of the transmitter. The data associated with an environmental condition may include pressure, temperature, humidity, and/or other environmental condition information. The hybrid block may include data associated with a reference time correction associated with the transmitter. The hybrid block may include data associated with a transmit quality metric associated with the transmitter. The hybrid block may include data associated with a packet type of the hybrid block. The hybrid block may include encrypted data. The hybrid block may include data encoded with error control coding. The error control coding may be convolutional or other error control encoding. The hybrid block may include cyclical redundant checking (CRC) data.

The range block sent from the transmitter may include, for example, a preamble and a transmitter sequence encoded with a first spreading code. The range block sent from the second transmitter may include the preamble and a second transmitter sequence encoded with a second spreading code. The first and second spreading codes may be same or may be spreading codes. The first and second spreading codes may be different Gold codes.

The first transmit frame may have a duration of one second or approximately one second and the plurality of predefined slots may be ten slots The first transmit frame may be sent using binary phase shift keying (BPSK), quadrature phase shift keying (QPSK), or other modulation methods.

The hybrid block may include a plurality of data symbols. The plurality of data symbols may be ninety nine data symbols. The hybrid block may further include a guard signal. The guard signal may be a blank or off signal or signal segment. The hybrid block may include a preamble. The preamble may include seven symbols.

The hybrid block sent from the transmitter may include, for example, a first portion of data associated with a transmitter parameter. The second hybrid block may include a second portion of data associated with the transmitter parameter. The first portion of data may represent a first lowered resolution value of the transmitter parameter, and the second portion of data may represent a second lowered resolution value of the transmitter parameter. The first lowered resolution value and the second lowered resolution value may be different lowered resolution values. The first lowered resolution value and the second lowered resolution value may be selected so as to be usable in combination to generate a higher resolution value at a receiver. The receiver may combine received signals with the first lowered resolution value and the second lowered resolution value to generate the higher resolution value.

The transmitter parameter may be, for example, a position value. The position value may be a longitude value. The position value may be a latitude value. The position value may be an altitude or depth value. The transmitter parameter may be a temperature value. The transmitter parameter may be a pressure value.

In another aspect, the disclosure relates to a transmitter for providing positioning information, The transmitter may include, for example, one or more of a processing element for generating a range block including a ranging signal and a hybrid block including a positioning signal including positioning data, and an output module for sending the range block in a predefined slot of a plurality of predefined slots comprising a first transmit frame and sending the hybrid block in the predefined slot in a second transmit frame disjoint from the first transmit frame.

In another aspect, the disclosure relates to a transmitter for providing positional information. The transmitter may include, for example, one or more of: means for generating a range block including a ranging signal; means for sending the range block, wherein the range block is sent in a predefined slot of a plurality of predefined slots comprising a first transmit frame; means for generating a hybrid block including a positioning signal including positioning data; and means for sending the hybrid block, wherein the hybrid block is sent in the predefined slot in a second transmit frame disjoint from the first transmit frame.

In another aspect, the disclosure relates to a processor or machine-readable storage medium, such as a memory, disk, or other storage medium. The medium may, for example, include instructions for causing a programmable device such as a computer processor to perform or control one or more of the stages of: generating a range block including a ranging signal; initiating transmission of the range block, wherein the range block is transmitted in a predefined slot of a plurality of predefined slots comprising a first transmit frame; generating a hybrid block including a positioning signal including positioning data; and initiating transmission of the hybrid block. The hybrid block may be transmitted in the predefined slot in a second transmit frame disjoint from the first transmit frame.

In another aspect, the disclosure relates to a method for receiving and processing positioning signals in a user device, such as a cellular phone or other portable device. The method may include, for example, receiving from a transmitter one or more range block signals and one or more hybrid block signals. The method may further include processing the one or more range block signals and one or more hybrid block signals to determine positioning data or information provided from the transmitter. The method may further include receiving range and hybrid block signals from a plurality of additional transmitters and determining position data or information provided from the plurality of additional transmitters. The range and/or hybrid block signals may be signaling as provided from transmitters/beacons as described herein.

The method may further include, for example, determining altitude or depth information associated with the user device. The method may further include determining a position or location of the user device by trilaterilization based at least in part on the hybrid and range blocks received from the first and additional transmitters. The position or location of the user device may be further determined based on the altitude or depth information associated with the user device. The altitude or depth information may be determined using a pressure sensor or altimeter device coupled to or incorporated in the user device. The altitude or depth information may be determined by comparing a pressure measurement at the user device with pressure information provided by the transmitters along with known or received altitude information associated with the transmitters.

In another aspect, the disclosure relates to user device for receiving and processing positioning signals to determine location/position information. The user device may include, for example, a receiver module configured to receive from a plurality of transmitters one or more range block signals and one or more hybrid block signals. The user device may further include a processing element to process the received one or more range block signals and one or more hybrid block signals to determine positioning data or information provided from the transmitter. The range and/or hybrid block signals may be provided to the receiver using signaling as provided from transmitters/beacons as described herein.

In another aspect, the disclosure relates to a user device for receiving and processing positioning signals to determine location/position information. The user device may include one or more of: means for receiving from a transmitter one or more range block signals and one or more hybrid block signals; means for determining a position or location of the user device by trilateration based at least in part on the hybrid and range blocks received from the first and additional transmitters; means for further determining location/position information based on altitude or depth information associated with the user device; pressure sensing or altimeter means; and means for determining altitude or depth information by comparing a pressure measurement at the user device with pressure information provided by the transmitters along with known or received altitude information associated with the transmitters;

In another aspect, the disclosure relates to a processor or machine-readable storage medium, such as a memory, disk, or other storage medium. The medium may, for example, include instructions for causing a programmable device such as a computer processor to perform or control one or more of the stages of: receiving from a transmitter one or more range block signals and one or more hybrid block signals; processing the one or more range block signals and one or more hybrid block signals to determine positioning data or information provided from the transmitter; receiving range and hybrid block signals from a plurality of additional transmitters and determining position data or information provided from the plurality of additional transmitters; determining altitude or depth information associated with the user device; determining a position or location of the user device by trilateration based at least in part on the hybrid and range blocks received from the first and additional transmitters; further determining the position or location of the user device based on the altitude or depth information associated with the user device; and comparing a pressure measurement at the user device with pressure information provided by the transmitters along with known or received altitude information associated with the transmitters. The range and/or hybrid block signals may be signaling as provided from transmitters/beacons as described herein.

In another aspect, the disclosure relates to a system for providing location/position information. The system may include, for example, a plurality of terrestrial transmitters/beacons configured to provide ones of a corresponding plurality of signals including information usable to determine location/position information. The system may further include a plurality of user devices configured to receive the ones of the plurality of signals and determine, based at least in part on the ones of a plurality of signals, a first set of location/position information associated with the user device.

The system may further include, for example, a location server system in communication with the transmitters/beacons and/or user devices. The location server system may be configured to receive information from the user device and provide, based at least in part on the received information, information associated with a location or position of the user terminal or information usable by the user terminal to determine location or position information in conjunction with information received at the user device from the plurality of transmitters/beacons.

Various additional aspects, features, and functions are described below in conjunction with the appended Drawings.

Example Embodiments

In the following description, numerous specific details are introduced to provide a thorough understanding of, and enabling description for, the systems and methods described. One skilled in the relevant art, however, will recognize that these embodiments can be practiced without one or more of the specific details, or with other components, systems, and the like. In other instances, well-known structures or operations are not shown, or are not described in detail, to avoid obscuring aspects of the disclosed embodiments.

FIG. 1 is a block diagram illustrating details of an example location/positioning system 100 on which various embodiments may be implemented. Positioning system 100, also referred to herein as a Wide Area Positioning System (WAPS), or "system" for brevity, includes a network of synchronized beacons (also denoted herein as "transmitters"), which are typically terrestrial, as well as user devices (also denoted herein as "receiver units" or "receivers" for brevity) configured to acquire and track signals provided from the beacons and/or other position signaling, such as may be provided by a satellite system such as the Global Positioning System (GPS) and/or other satellite or terrestrially based position systems. The receivers may optionally include a location computation engine to determine position/location information from signals received from the beacons and/or satellite systems, and the system 100 may further include a server system in communication with various other systems, such as the beacons, a network infrastructure, such as the Internet, cellular networks, wide or local area networks, and/or other networks. The server system may include various system-related information, such as an index of towers, a billing interface, one or more encryption algorithm processing modules, which may be based on one or more proprietary encryption algorithms, a location computation engine module, and/or other processing modules to facilitate position, motion, and/or location determination for users of the system.

As shown in exemplary system 100, the beacons may be in the form of a plurality of transmitters 110, and the receiver units may be in the form of one or more user devices 120, which may be any of a variety of electronic communication devices configured to receive signaling from the transmitters 110, as well as optionally be configured to receive GPS or other satellite system signaling, cellular signaling, Wi-Fi signaling, Wi-Max signaling, Bluetooth, Ethernet, and/or other data or information signaling as is known or developed in the art. The receiver units 120 may be in the form of a cellular or smart phone, a tablet device, a PDA, a notebook or other computer system, and/or similar or equivalent devices. In some embodiments, the receiver unit may be a standalone location/positioning device configured solely or primarily to receive signals from the transmitters 110 and determine location/position based at least in part on the received signals. As described herein, receiver units 120 may also be denoted herein as "User Equipment" (UEs), handsets, smart phones, tablets, and/or simply as a "receiver."

The transmitters 110 (which may also be denoted herein as "towers") are configured to send transmitter output signals to multiple receiver units 120 (a single receiver unit 120 is shown in FIG. 1 for simplicity, however, a typical system will be configured to support many receiver units within a defined coverage area) via communication links 113 as shown. The transmitters 110 may also be connected to a server system 130 via communication links 133, and/or may have other communication connections (not shown) to a network infrastructure 170, such as via wired connections, cellular data connections, Wi-Fi, Wi-Max, or other wireless connections, and the like.

One or more receiver 120 may receive signaling from multiple transmitters 110 via corresponding communication links 113 from each of the transmitters 110. In addition, as shown in FIG. 1, a receiver 120 may also be configured to receive and/or send other signals, such as, for example, cellular network signals via communication link 163 from a cellular base station (also known as a NodeB, eNB, or base station), Wi-Fi network signals, Pager network signals, or other wired or wireless connection signaling, as well as satellite signaling via satellite communication links 153, such as from a GPS or other satellite positioning system. While the satellite positioning signaling shown in the exemplary embodiment of FIG. 1 is shown as being provided from GPS system satellites 150, in other embodiments the signaling may be provided from other satellite systems and/or, in some embodiments, terrestrial-based wired or wireless positioning systems or other data communication systems.

In an exemplary embodiment, the transmitters 110 of system 100 are configured to operate in an exclusively licensed or shared licensed/unlicensed radio spectrum; however, some embodiments may be implemented to provide signaling in unlicensed shared spectrum. The transmitters 110 may transmit signaling in these various radio bands using novel signaling as is described subsequently herein. This signaling may be in the form of a proprietary signal configured to provide specific data in a defined format advantageous for location and navigation purposes. For example, as described subsequently herein, the signaling may be structured to be particularly advantageous for operation in obstructed environments, such as where traditional satellite position signaling is attenuated and/or impacted by reflections, multipath, and the like. In addition, the signaling may be configured to provide fast acquisition and position determination times to allow for quick location determination upon device power-on or location activation, reduced power consumption, and/or to provide other advantages.

Various embodiments of WAPS may be combined with other positioning systems to provide enhanced location and position determination. Alternately, or in addition, a WAPS system may be used to aid other positioning systems. In addition, information determined by receiver units 120 of WAPS systems may be provided via other communication network links 163, such as cellular, Wi-Fi, Pager, and the like, to report position and location information to a server system or systems 130, as well as to other networked systems existing on or coupled to network infrastructure 170. For example, in a cellular network, a cellular backhaul link 165 may be used to provide information from receiver units 120 to associated cellular carriers and/or others (not shown) via network infrastructure 170. This may be used to quickly and accurately locate the position of receiver 120 during an emergency, or may be used to provide location-based services or other functions from cellular carriers or other network users or systems.

It is noted that, in the context of this disclosure, a positioning system is one that localizes one or more of latitude, longitude, and altitude coordinates, which may also be described or illustrated in terms of one, two, or three dimensional coordinate systems (e.g., x, y, z coordinates, angular coordinates, etc.). In addition, it is noted that whenever the term 'GPS' is referred to, it is done so in the broader sense of Global Navigation Satellite Systems (GNSS) which may include other existing satellite positioning systems such as GLONASS as well as future positioning systems such as Galileo and Compass/Beidou. In addition, as noted previously, in some embodiments other positioning systems, such as terrestrially based systems, may be used in addition to or in place of satellite-based positioning systems.

Embodiments of WAPS include multiple towers or transmitters, such as multiple transmitters 110 as shown in FIG. 1, which broadcast WAPS data positioning information, and/or other data or information, in transmitter output signals to the receivers 120. The positioning signals may be coordinated so as to be synchronized across all transmitters of a particular system or regional coverage area, and may use a disciplined GPS clock source for timing synchronization. WAPS data positioning transmissions may include dedicated communication channel resources (e.g., time, code and/or frequency) to facilitate transmission of data required for trilateration, notification to subscriber/group of subscribers, broadcast of messages, general operation of the WAPS network, and/or for other purposed such as are described subsequently herein and/or in the following co-assigned patent applications which are incorporated by reference herein: United States Utility patent application Ser. No. 13/412,487, entitled WIDE AREA POSITIONING SYSTEMS, filed on Mar. 5, 2012; U.S. Utility patent Ser. No. 12/557,479 (now U.S. Pat. No. 8,130,141), entitled WIDE AREA POSITIONING SYSTEM, filed Sep. 10, 2009; United States Utility patent application Ser. No. 13/412,508, entitled WIDE AREA POSITIONING SYSTEM, filed Mar. 5, 2012; United States Utility patent application Ser. No. 13/296,067, entitled WIDE AREA POSITIONING SYSTEMS, filed Nov. 14, 2011; U.S. Provisional Patent Application Ser. No. 61/163,020, entitled WIDE AREA POSITIONING SYSTEM, filed Mar. 24, 2009; U.S. Provisional Patent Application Ser. No. 61/095,856, entitled WIDE AREA POSITIONING SYSTEM, filed Sep. 10, 2008; U.S. Provisional Patent Application Ser. No. 61/502,272, entitled DATA TRANSMISSION METHODS IN WIDE AREA POSITIONING SYSTEMS (WAPS), filed Jun. 28, 2011; U.S. Provisional Patent Application Ser. No. 61/502,276, entitled CODING IN WIDE AREA POSITIONING SYSTEMS, filed Jun. 28, 2011; and U.S. Provisional Patent Application Ser. No. 61/514,369, entitled CELL ORGANIZATION AND TRANSMISSION SCHEMES IN A WIDE AREA POSITIONING SYSTEM (WAPS), filed Aug. 2, 2011. These application may also be denoted collectively herein as the "incorporated applications." The various aspect, details, devices, systems, and methods disclosed herein may be combined with the teachings of the incorporated applications in WAPS or other similar systems in various embodiments.

In a positioning system that uses time difference of arrival or trilateration, the positioning information typically transmitted includes one or more of precision timing sequences and positioning data, where the positioning data includes the location of transmitters and various timing corrections and other related data or information. In one WAPS embodiment, the data may include additional messages or information such as notification/access control messages for a group of subscribers, general broadcast messages, and/or other data or information related to system operation, users, interfaces with other networks, and other system functions. The positioning data may be provided in a number of ways. For example, the positioning data may be modulated onto a coded timing sequence, added or overlaid over the timing sequence, and/or concatenated with the timing sequence.

Data transmission methods and apparatus described herein may be used to provide improved location information throughput for the WAPS. In particular, higher order modulation data may be transmitted as a separate portion of information from pseudo-noise (PN) ranging data. This may be used to allow improved acquisition speed in systems employing CDMA multiplexing, TDMA multiplexing, or a combination of CDMA/TDMA multiplexing. The disclosure herein is illustrated in terms of wide area positioning systems in which multiple towers broadcast synchronized positioning signals to mobile receivers and, more particularly, using towers that are terrestrial; however, the embodiments are not so limited and other systems within the spirit and scope of the disclosure may also be implemented.

In an exemplary embodiment, a WAPS uses coded modulation sent from a tower or transmitter, such as transmitter 110, called spread spectrum modulation or pseudo-noise (PN) modulation, to achieve wide bandwidth. The corresponding receiver unit, such as receiver or user device 120, includes one or more modules to process such signals using a despreading circuit, such as a matched filter or a series of correlators, for example. Such a receiver produces a waveform which, ideally, has a strong peak surrounded by lower level energy. The time of arrival of the peak represents the time of arrival of the transmitted signal at the mobile receiver. Performing this operation on a multiplicity of signals from a multiplicity of towers, whose locations are accurately known, allows determination of the receivers location via trilateration. Various additional details related to WAPS signal generation in a transmitter, such as transmitter 110, along with received signal processing in a receiver, such as receiver 120, are described subsequently herein.

In one embodiment, a WAPS may use binary coded modulation as the spreading method. The WAPS signals of an exemplary embodiment may include two specific types of information: (1) a high speed ranging signal, and (2) location data such as transmitter ID and position, time of day, health, environmental conditions such as pressure data, etc. WAPS may, similar to GPS, transmit location information by modulating a high speed binary pseudorandom ranging signal with a lower rate information source. In addition to this application, the incorporated applications disclose embodiments of methods that use a pseudorandom ranging signal and a modulating information signal, both of which may utilize higher order modulations, such as quaternary or octonary modulation. In one embodiment, the ranging signal is binary phase modulated, and location information is provided in a separate signal using higher order modulation.

Conventional systems use a format of a position location signal (e.g., used in a Time Division Multiplexing arrangement) in which each slot transmission comprises a pseudorandom ranging signal followed by various types of location data. These conventional systems also include a synchronization, or sync, signal, which may be deleted if the pseudorandom ranging signal is used also as the sync signal. However, as with other earlier systems, the location data of these conventional systems is binary, which limits throughput. These systems also transmit a large number of binary bits during the interval in which the location data is transmitted.

To address these limitations, in exemplary embodiments, a binary, or quaternary, pseudorandom signal may be transmitted in a particular slot followed by a very higher order modulated data signal. For example, in a given slot one or more location information symbols may be transmitted using differential 16-phase modulation, in order to transmit four bits of information per slot. This represents a four-fold throughput improvement versus the one bit typically transmitted when binary phase modulation is imposed upon the pseudorandom carrier. Other types of modulation of location information may also be utilized, such as 16 QAM, etc. In addition certain error control modulation methods may be used for the higher level modulation, such as the use of Trellis codes. These modulation methods generally reduce error rates.

Figure 2:
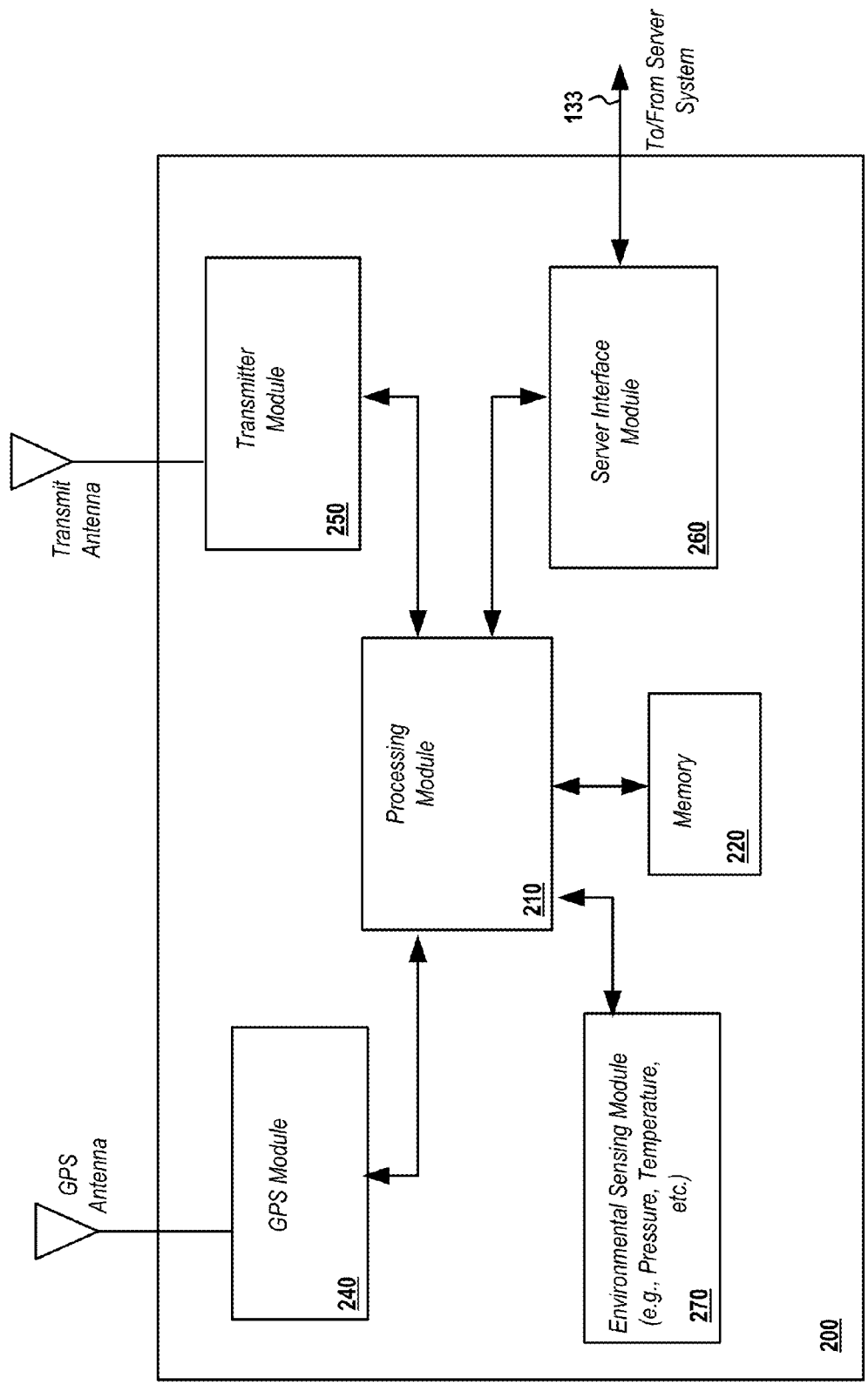
FIG. 2 is a block diagram illustrating details of one embodiment of a location/position transmitter/beacon in accordance with certain aspects.

FIG. 2 is a block diagram illustrating details of one embodiment 200 of a beacon/transmitter system from which location/positioning signals as described subsequently herein may be sent. Transmitter embodiment 200 may correspond with transmitters 110 as shown in FIG. 1. It is noted that transmitter embodiment 200 includes various blocks for performing associated signal reception and/or processing; however, in other embodiments these blocks may be combined and/or organized differently to provide similar or equivalent signal processing, signal generation, and signal transmission. Additional block-diagram details of embodiments of circuits for generating transmitter output signals, which may be components of or integrated in transmitter 200, in whole or in part, are described subsequently herein with respect to FIGS. 22 & 23.

As shown in FIG. 2, transmitter/beacon embodiment 200 may include one or more GPS modules 240 for receiving GPS signals and providing location information and/or other data, such as timing data, dilution of precision (DOP) data, or other data or information as may be provided from a GPS or other positioning system, to a processing module 210. It is noted that while transmitter 200 is shown in FIG. 2 with a GPS module, other modules for receiving satellite or terrestrial signals and providing similar or equivalent output signals, data, or other information may alternately be used in various embodiments. GPS or other timing signals may be used for precision timing operations within transmitters and/or for timing correction across the WAPS network.

Transmitter 200 may also include one or more transmitter modules 250 for generating and sending transmitter output signals as described subsequently herein. Transmitter module 250 may also include various elements as are known or developed in the art for providing output signals to a transmit antenna, such as analog or digital logic and power circuitry, signal processing circuitry, tuning circuitry, buffer and power amplifiers, and the like. Signal processing for generating the output signals may be done in the processing module 210 which, in some embodiments, may be integrated with the transmitter module 250 or, in other embodiments, may be a standalone processing module for performing multiple signal processing and/or other operational functions.

One or more memories 220 may be coupled with processing module 210 to provide storage and retrieval of data and/or to provide storage and retrieval of instructions for execution in the processing module 210. For example, the instructions may be instructions for performing the various processing methods and functions described subsequently herein, such as for determining location information or other information associated with the transmitter, such as local environmental conditions, as well as to generate transmitter output signals to be sent to the user devices 120 as shown in FIG. 1.

Transmitter 200 may further include one or more environmental sensing modules 270 for sensing or determining conditions associated with the transmitter, such as, for example, local pressure, temperature, or other conditions. In an exemplary embodiment, pressure information may be generated in environmental sensing module 270 and provided to processing module 210 for integration with other data in transmitter output signals as described subsequently herein. One or more server interface modules 260 may also be included in transmitter 200 to provide an interface between the transmitter and server systems, such as system 130 as shown in FIG. 1, and/or to a network infrastructure, such as network infrastructure 170 as shown in FIG. 1. For example, system 130 may send data or information associated with the location system and/or user devices to transmitters 200 via interface module 260. In addition, transmitter 200 may include other modules (not shown) to provide related operational functionality.

Figure 3:
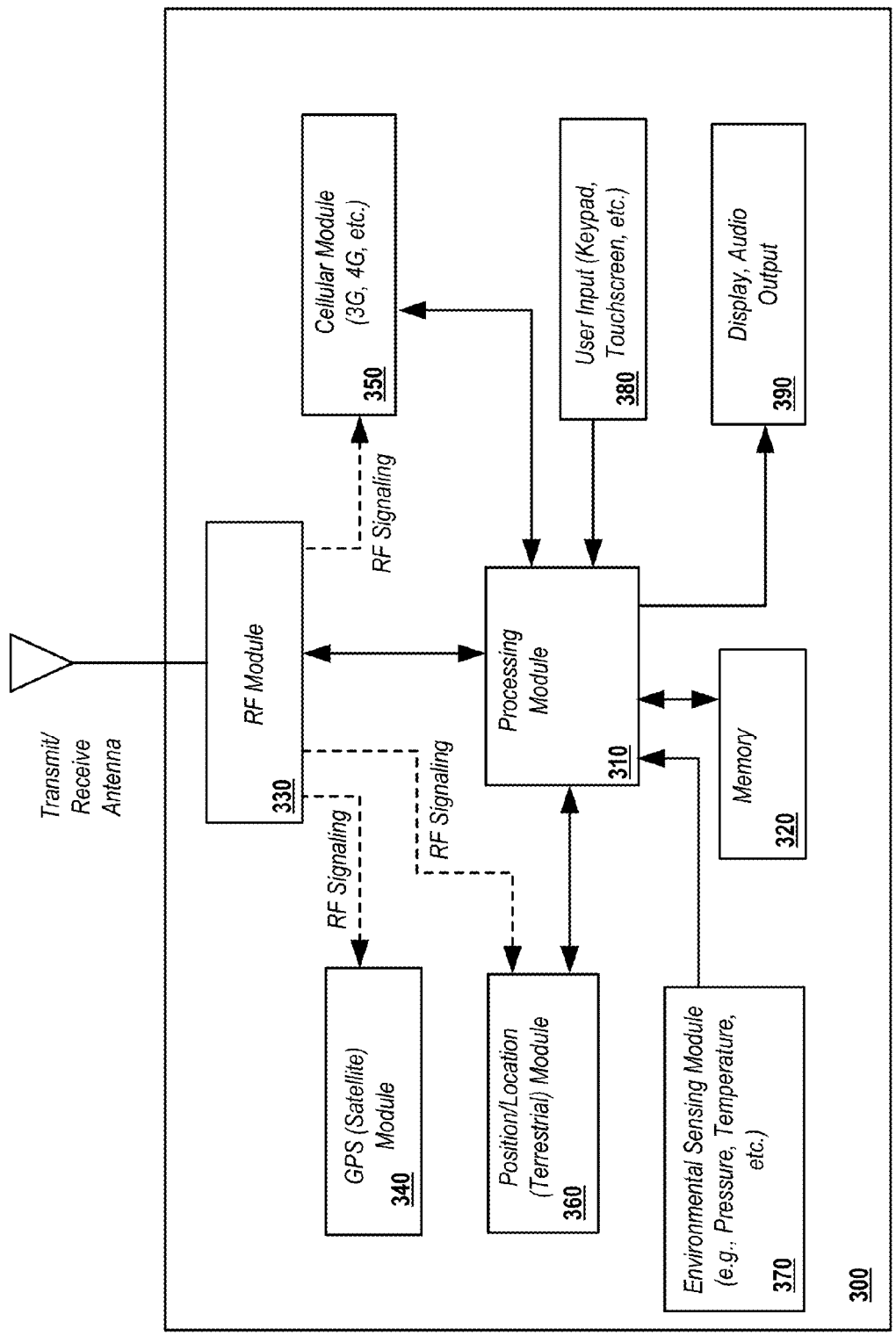
FIG. 3 is a block diagram illustrating details of one embodiment of a receiver/user device in accordance with certain aspects.

FIG. 3 is a block diagram illustrating details of one embodiment 300 of a user device or receiver 300 on which transmitter signals may be received and processed to determine location/position information. Receiver embodiment 300 may correspond with user device 120 as shown in FIG. 1.

Receiver 300 may include one or more GPS modules 340 for receiving GPS signals and providing location information and/or other data, such as timing data, dilution of precision (DOP) data, or other data or information as may be provided from a GPS or other positioning system, to processing module 310. It is noted that while receiver 300 is shown in FIG. 3 with a GPS module, other modules for receiving satellite or terrestrial signals and providing similar or equivalent output signals, data, or other information may alternately be used in various embodiments.

Receiver 300 may also include one or more cellular modules 350 for sending and receiving data or information via a cellular or other data communications system. Alternately, or in addition, receiver 300 may include communications modules (not shown) for sending and/or receiving data via other wired or wireless communications networks, such as Wi-Fi, Wi-Max, Bluetooth, USB, or other networks.

Receiver 200 may include one or more position/location modules for receiving signals from terrestrial transmitters, such as transmitters 110 as shown in FIG. 1, and processing the signals to determine position/location information as described subsequently herein. Module 360 may be integrated with and/or may share resources such as antennas, RF circuitry, and the like with other modules, such as, for example, GPS module 340. For example, Position module 360 and GPS module 240 may share some or all radio front end (RFE) components and/or processing elements. Processing module 310 may be integrated with and/or share resources with Position module 360 and/or GPS module 340 to determine position/location information and/or perform other processing functions as described herein. Similarly, cellular module 350 may share RF and/or processing functionality with RF module 330 and/or processing module 310.

One or more memories 320 may be coupled with processing module 310 to provide storage and retrieval of data and/or to provide storage and retrieval of instructions for execution in the processing module 310. For example, the instructions may be instructions for performing the various processing methods and functions described subsequently herein, such as for determining location information or other information based on received transmitter, GPS, cellular, pressure, temperature, and/or other signals or data.

Transmitter 200 may further include one or more environmental sensing modules 370 for sensing or determining conditions associated with the receiver, such as, for example, local pressure, temperature, or other conditions. In an exemplary embodiment, pressure information may be generated in environmental sensing module 370 and provided to processing module 310 for use in determining location/position information in conjunction with received transmitter, GPS, cellular, or other signals.

Receiver 200 may further include various additional user interface modules, such as a user input module 380, which may be in the form of a keypad, touchscreen display, mouse, or other user interface element. Audio and/or video data or information may be provided on an output module 390, such as in the form or one or more speakers or other audio transducers, one or more visual displays, such as touchscreens, and/or other user I/O elements as are known or developed in the art. In an exemplary embodiment, output module 390 may be used to visually display determined location/position information based on received transmitter signals, and the determined location/position information may also be sent to cellular module 350 to an associated carrier or other entity.

Figure 4:
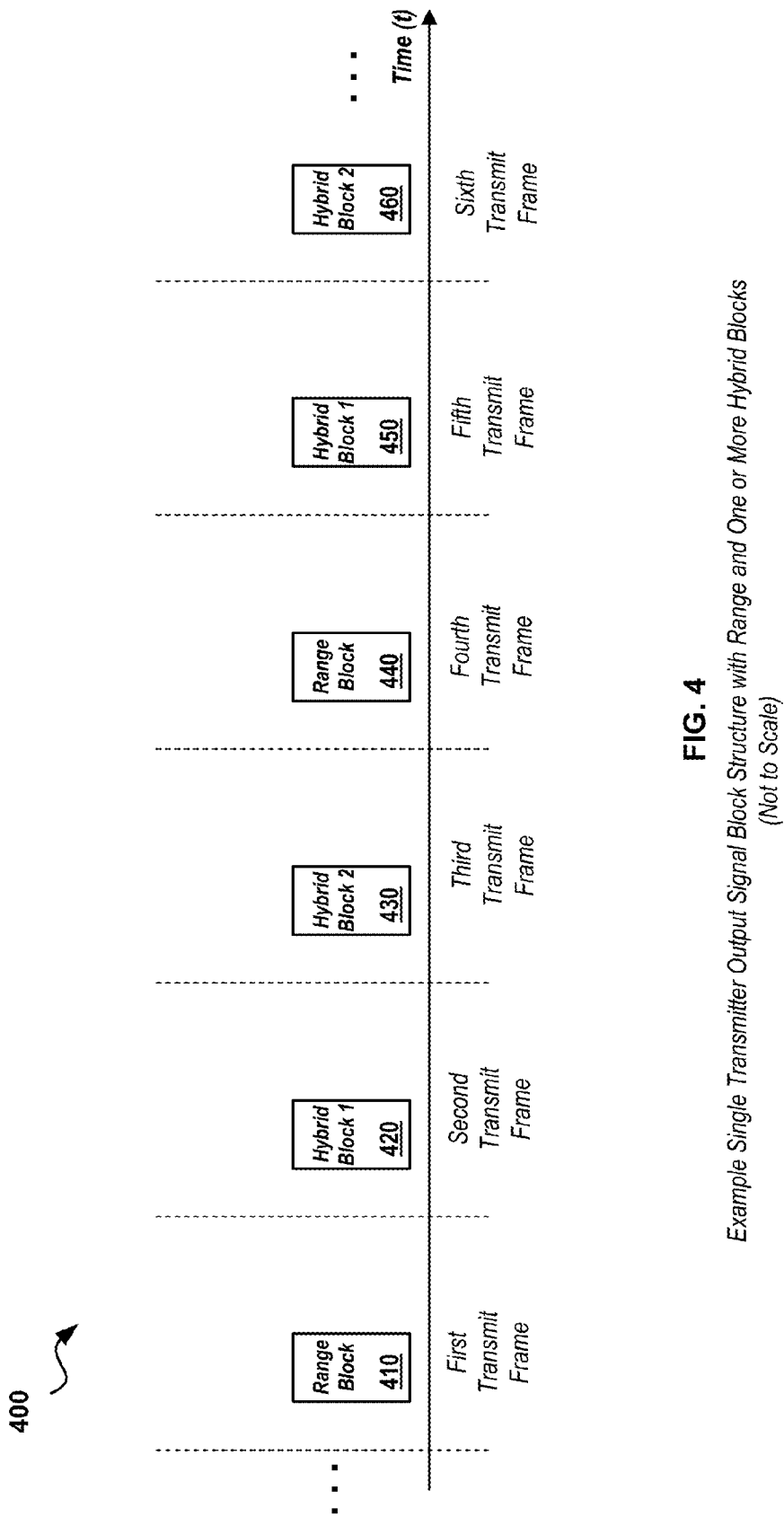
FIG. 4 is a block diagram illustrating details of one embodiment of a ranging and hybrid block transmission sequence in accordance with certain aspects.

As noted previously herein, beacons/transmitters, such as transmitters 110 as shown in FIG. 1, may be used to generate and send transmitter output signals to user devices/receivers, such as user device 120 as shown in FIG. 1. FIG. 4 illustrates details of an exemplary embodiment of transmitter output signaling 400 for use in providing location/position determination. Such signals may be received and processed at user devices, such as user device 120 to accurately and quickly determine location/position information (embodiments of processing methods for such signals are described subsequently herein).

As shown in FIG. 4, transmitter output signaling 400 may be structured in the form of frames and blocks, wherein each frame may include a plurality of blocks, which may be of different types to facilitate position/location applications. In particular, signaling providing range and hybrid data (e.g., data signaling and optionally ranging signaling or other information or signaling (also denoted here in as hybrid blocks)) may be used to implement signaling denoted herein as "DataBurst: signaling. In an exemplary embodiment, a hybrid block includes positioning data and ranging data. Slots in which range blocks are sent may be denoted as range slots, and slots in which hybrid blocks are sent may be denoted as data slots or hybrid slots. Within a frame, a plurality of blocks may be sent from ones of a plurality of transmitters, with each transmitter being allocated a particular timing window (denoted herein as a "slot") for its corresponding blocks. For example, in an exemplary embodiment, each transmitter may be allocated a single slot for transmission of one block within a frame. In other embodiments, multiple slots may be allocated per transmitter in each frame, such as a primary slot and a secondary slot (e.g., as shown in FIG. 7A), in which case the same or different types of blocks may be sent in a single frame. Various other slot allocations may be used in different embodiments, such as allocating slots only in every second, third, fourth, etc., frame, dynamically allocating slots based on network performance metrics, and the like.

Figure 8A:
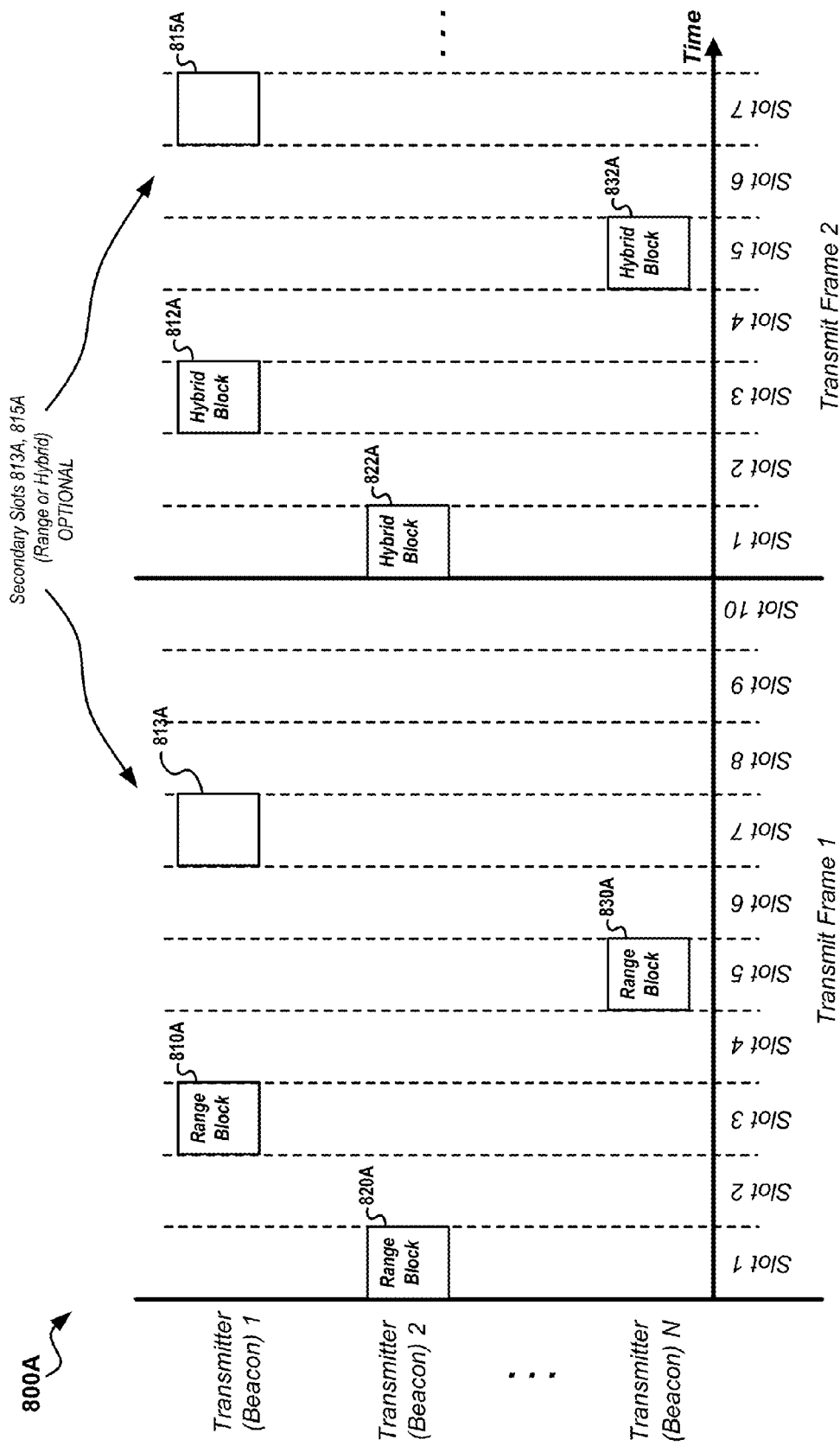
FIG. 8A illustrates details of one embodiment of multi-transmitter block-synchronized output signaling and timing in accordance with certain aspects.
Figure 8B:
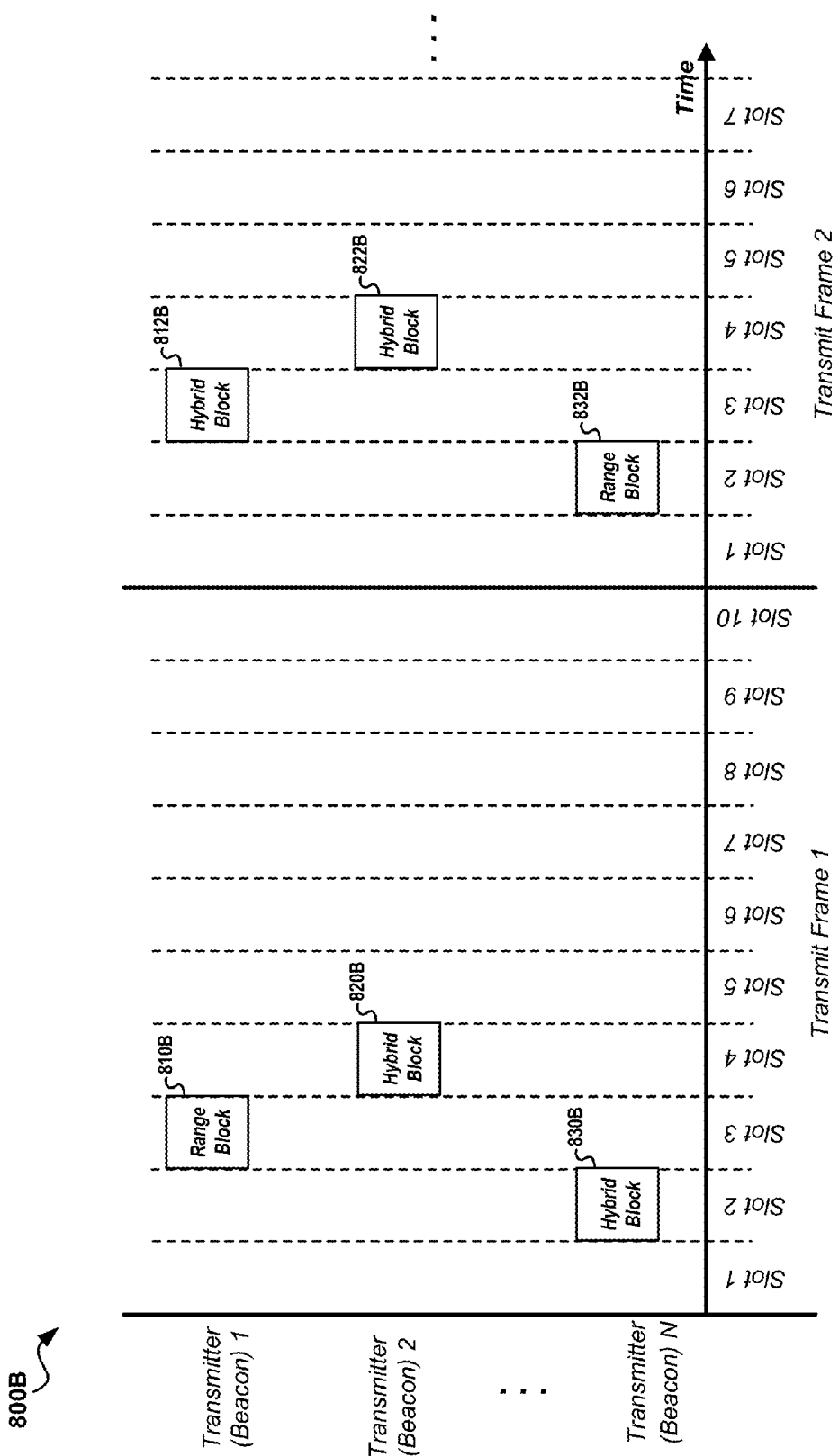
FIG. 8B illustrates details of an embodiment of multi-transmitter output signaling that is not block-synchronized and associated timing in accordance with certain aspects.

Example signaling 400 illustrates block transmission for a single transmitter, which may be, for example, one of the transmitters 110 as shown in FIG. 1. In this example, a sequence of blocks may be sent in successive frames in a predefined slot (it is noted that, as illustrated in FIG. 8A, that multiple blocks may, in some embodiments, be sent in two or more slots in a single frame). For example, the transmitter may send a first block 410, which may be a range block, in Frame 1, in a predefined slot, and may then may send a second block, which may be a hybrid block 420, in the same slot in the next frame (Frame 2), and may then send a third block, which may be another hybrid block 430, in the next frame (Frame 3). This particular signaling structure may be denoted as $RH_1H_2$ to indicate a sequence of Range, Hybrid 1, and Hybrid 2 blocks transmitted in sequence. The pattern may then be repeated at Frames 4, 5, and 6 as shown. In some embodiments, one or more frames may be omitted when transmitting a sequence of range and hybrid blocks. In addition, in some embodiments, fewer hybrid blocks (e.g., $RH_1$) or more (e.g., $RH_1H_2H_3 \ldots H_n$) hybrid blocks may be included in the signaling structure.

The DataBurst signaling structure 400 uses a separate slot for each of ranging and data transmission, however, the slots are typically the same slot number in different frames or, in some cases, in two or more different slots in the same frame. In an exemplary embodiment, the slots may be separated by a period of approximately one second (e.g., a frame duration of one second), but other timing may be used in alternate embodiments. In an exemplary embodiment, a range block 410 in one slot of the DataBurst structure uses BPSK pilot symbols for ranging (using, for example, seven Gold codes for preamble, 92 Gold codes for pilot symbols). The two slots that follow are occupied by hybrid blocks 420 and 430 (using, for example, four Gold codes for preamble, 16 Gold codes for pilot symbols, and 79 Gold codes for data transmission using BPSK at 1 GC/symbol). In an exemplary embodiment, all blocks may include the same first four preamble symbols, as shown in further details in FIGS. 9-11. Error-correcting codes may be used to ensure operation at low signal-to-noise ratios (SNRs), CRCs may be used to ensure that the decoded bits are valid (e.g., one error-correcting code that may be used is a convolutional code with constraint length 7, and 16-bit CRC). The DataBurst signaling may further use temporally-distributed resolution, as described in further detail subsequently herein, to reduce the number of bits, in order to fit them in as few slots as possible, while still enabling long term high accuracy. Use of the DataBurst structure, along with error correcting codes, enables location/positioning systems to support 102 information bits in one data packet for transmission of information used in trilateration (e.g., latitude, longitude, altitude, etc.).

In an exemplary DataBurst signaling structure embodiment, a dedicated pilot slot with a range block may be used for ranging (e.g., a range block such as block 410 of FIG. 4), which allows a relatively long coherent integration length (e.g., up to 96 ms), leading to improved ranging performance. The hybrid blocks can also be used for ranging in corresponding data slots, such that receivers with a high SNR can do ranging even in the data slots (for example, one Gold code integration length may be used, or use the decision on the bits to help coherently combine the signal across bits). A short pilot burst can also be provided in the hybrid block in a data slot to facilitate better SNR ranging.

Receivers with lower SNR may perform ranging only on range blocks in the ranging slots. An exemplary embodiment may transmit 93 known Gold code symbols in a range block in a ranging slot, wherein the Gold code symbols are used as pilot symbols to aid in ranging. Also, 96 data GC symbols may be transmitted in a hybrid block in a data slot for use in transmitting information required for trilateration (e.g., transmit latitude/longitude/altitude).

Various embodiments may use error-correcting codes to ensure operation at low SNRs and use CRCs to ensure that the decoded bits are valid. In an exemplary embodiment, a convolutional code may be used as the error correction code; however, other error correction codes may be used in alternate embodiments. In an exemplary embodiment, the convolution code may have a constraint-length 7 and may be a rate-1/2 code that is punctured depending on the number of info bits to ensure that the encoded bits fit within the 96 available GC symbols. Additionally, 16 all-zero tail bits may be added to the information bits before encoding, due to the nature of convolutional coding and decoding. A CRC check may be accomplished by using, for example, a length-$N_{crc}$ CRC code. The value of $N_{crc}$ in an exemplary embodiment is 16.

Therefore, in this exemplary implementation, generation of a signal comprises taking $N_{info}$ info bits, adding the 16 CRC bits, adding 16 tail bits, and encoding the resulting sequence using the convolutional code. The data is then punctured to ensure that it all fits within the number of bits per slot corresponding to 96 data symbols. Finally, the data is interleaved and transmitted over the channel to the receiver. The receiver demodulates the received signal, de-interleaves the resulting soft bits and passes them through the decoder. Using the output of the decoder, the receiver does a CRC check to ensure that the block of data was sent successfully.

An exemplary embodiment uses BPSK modulation in range blocks in ranging slots, meaning that 93 known bits are modulated onto 93 GC periods. These are the pilot bits that enable the long coherent integration times. The transmitter may, in some implementations, send one of $N_{seq}$ pilot bit sequences, in order to send a very low-information-rate signal during the ranging slot. For example, the transmitter can send one of four pilot bit sequences in order to transmit two bits of information during the ranging slot to provide some data in a ranging block.

An exemplary embodiment may use differential QPSK (DQPSK) modulation in data slots to facilitate data transfer at a desirable rate. In the described exemplary embodiment, since 96 GC DQPSK symbols are available in data slots, this translates into the ability to transmit 190 raw bits in each data slot (the first two bits are "lost" due to the differential encoding of DQPSK). The number of information bits per slot is lower in this implementation than 190 due to use of error-correction coding and CRC bits, as described further below.

In hybrid slots, after the length-4 preamble, the WAPS of an exemplary embodiment uses BPSK modulation to transmit 16 pilot bits over 16 Gold code periods, and then uses differential BPSK (DBPSK) modulation to transmit 79 data bits over 79 Gold code periods. The transmitter may use the last pilot bit as the first DBPSK data bit so that it can transmit 79 data bits over 79 Gold code periods, even though it is using DBPSK. In an exemplary embodiment the same data may be transmitted twice in two consecutive data slots. This transmission scheme allows high SNR users to use one data slot to decode the data in order to get a fast time to first fix (TTFF). This transmission scheme further allows low SNR users to soft combine the data across two data slots in order to get a reliable decoding of the data. Also, separation of the ranging and data slots may be used to de-link the performance of the ranging and data slots. Coherent integration may be used at a receiver across the ranging slots without the need to demodulate the data using complicated data wipe-off techniques, whereas the high symbol rate along with the modulation alphabet size allows higher rate of data transmission in the data slots.

Figure 5:
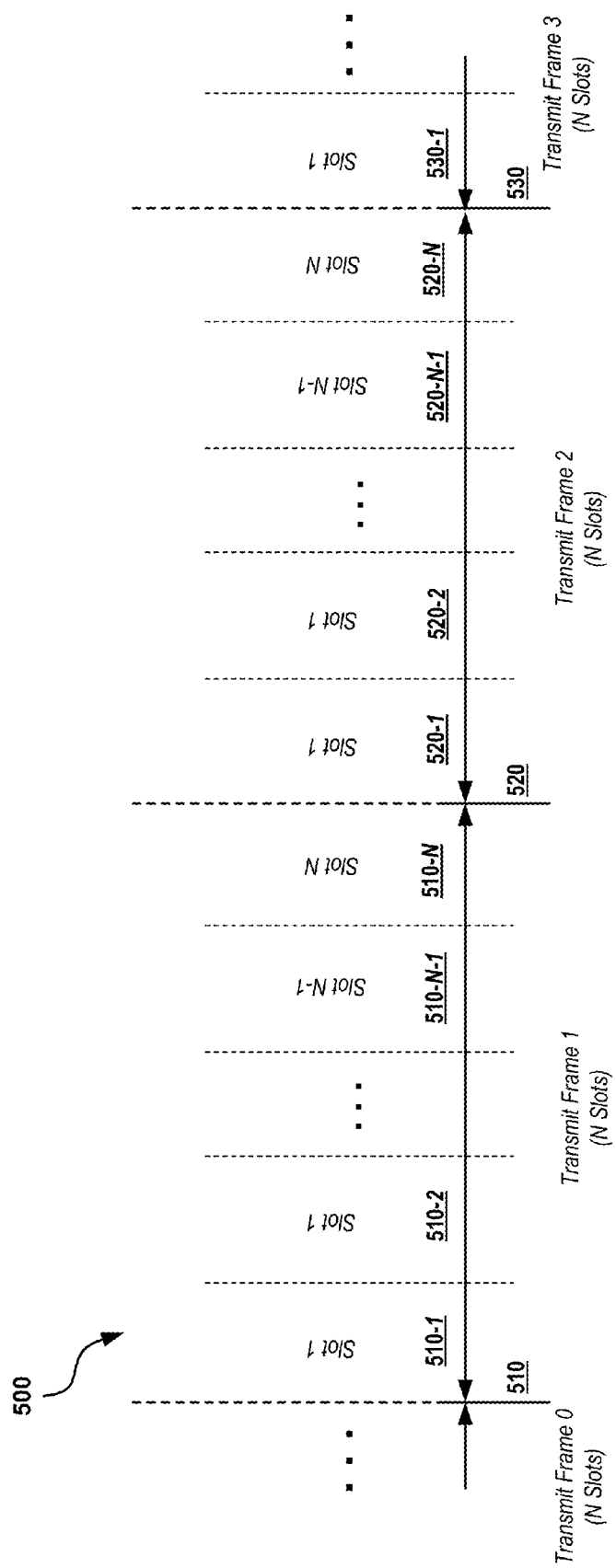
FIG. 5 illustrates details of one embodiment of a transmission frame and slot structure in accordance with certain aspects.

FIG. 5 illustrates details of an example frame structure embodiment 500. As described previously herein, a frame 510 may be divided into multiple slots. This is illustrated as Slots 1 to Slots N of frame 1 as 510-1 through 510-N. Corresponding slots of subsequent frame 2 are denoted as 520-1 through 520-N, and a first slot of frame 3, slot 530-1, is also shown. In an exemplary embodiment as described subsequently herein each frame may be one second in length and may be divided into ten slots, resulting in a time duration of 100 milliseconds per slot. Other frame lengths and numbers of slots may be used in alternate embodiments.

Figure 6:
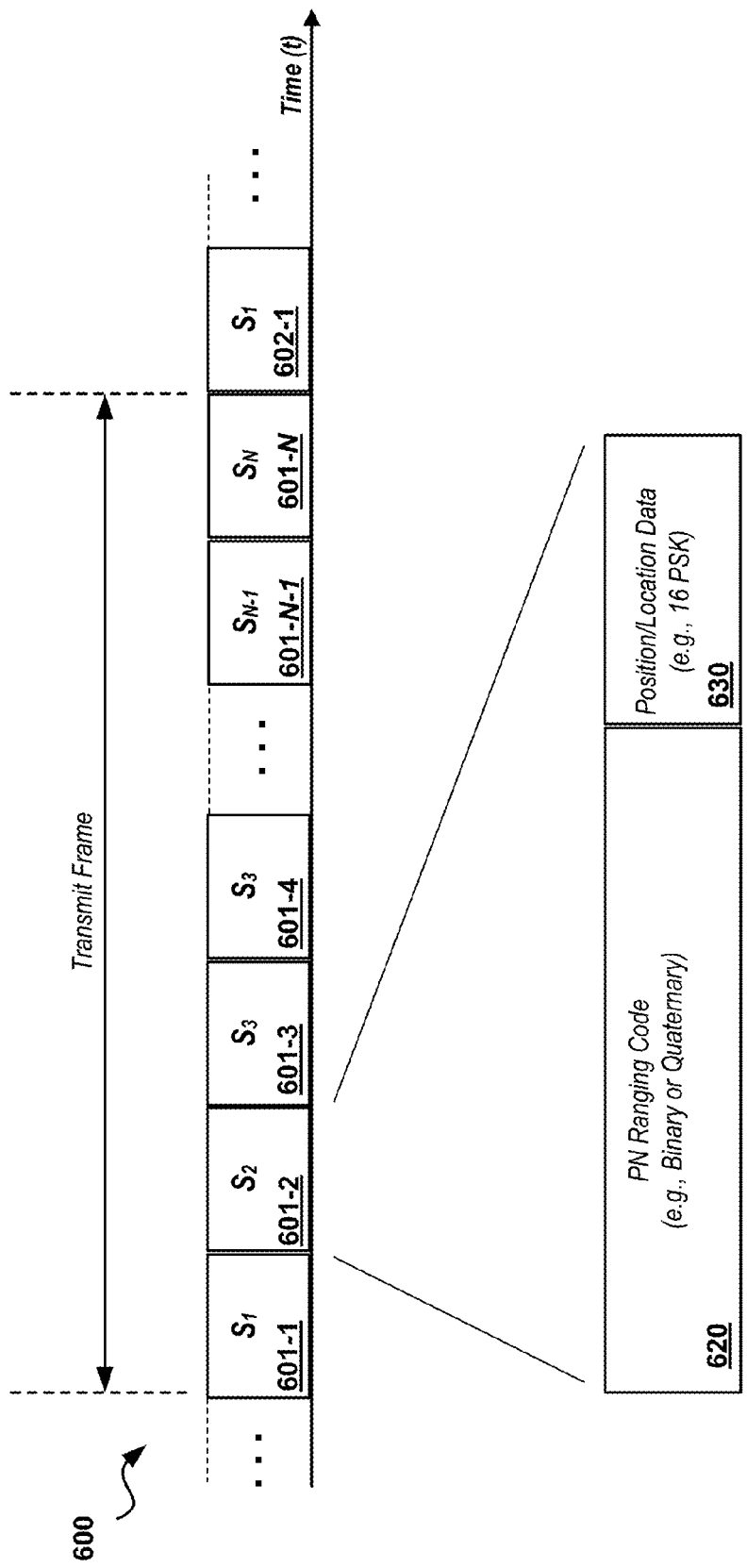
FIG. 6 illustrates details of one embodiment of a slot structure and example slot signaling format in accordance with certain aspects.

FIG. 6 illustrates an example of data organization 600 in slots, such as shown in FIG. 5, in a transmitter output signal under one embodiment, along with an example slot signaling structure. Signaling in slots, such as example Frame 1, Slot 2, 601-2, may include a pseudonoise (PN) ranging code 620, which may be, for example, binary or quaternary, along with data 630, which may be position/location data such as is described subsequently herein, and/or other system data. The PN ranging code may be a repetition of multiple frames of a pseudorandom sequence. The location data may comprise one or more symbols of data. In one embodiment, the data may be in 16 phase-shift keying (PSK) format.

When considering signal strength and packet structure, the ranging signal in terrestrial WAPS systems is generally assumed to have a high SNR. For example if an SNR per chip of a 1023 length pseudorandom ranging signal is assumed to be 0 dB, then the SNR per PN frame would be approximately 30 dB. However, 20 dB SNR per symbol is in most cases adequate for transmission of high level information. Thus, if the majority of the transmission slot is a ranging code, in order to maximize ranging signal SNR and hence precision, then 10% of the slot can be allocated to location information transmission and while continuing to provide high throughput, for example 4 bits per slot.

Since the correlation output of the ranging code is assumed to be high, the (complex) shape of its peak represents an excellent estimate of the channel impulse response. Accordingly, in one embodiment, the measurement of the correlation peak amplitude and phase structure may be used in a receiver, such as user device 120 as shown in FIG. 1, as a channel estimation reference to help improve the demodulation of the higher order modulated location data. This may be especially important if coherent demodulation of the location data is employed in the receiver. These measurements may be used to compensate amplitude and phase fluctuations from one data symbol to the next.

Figure 7:
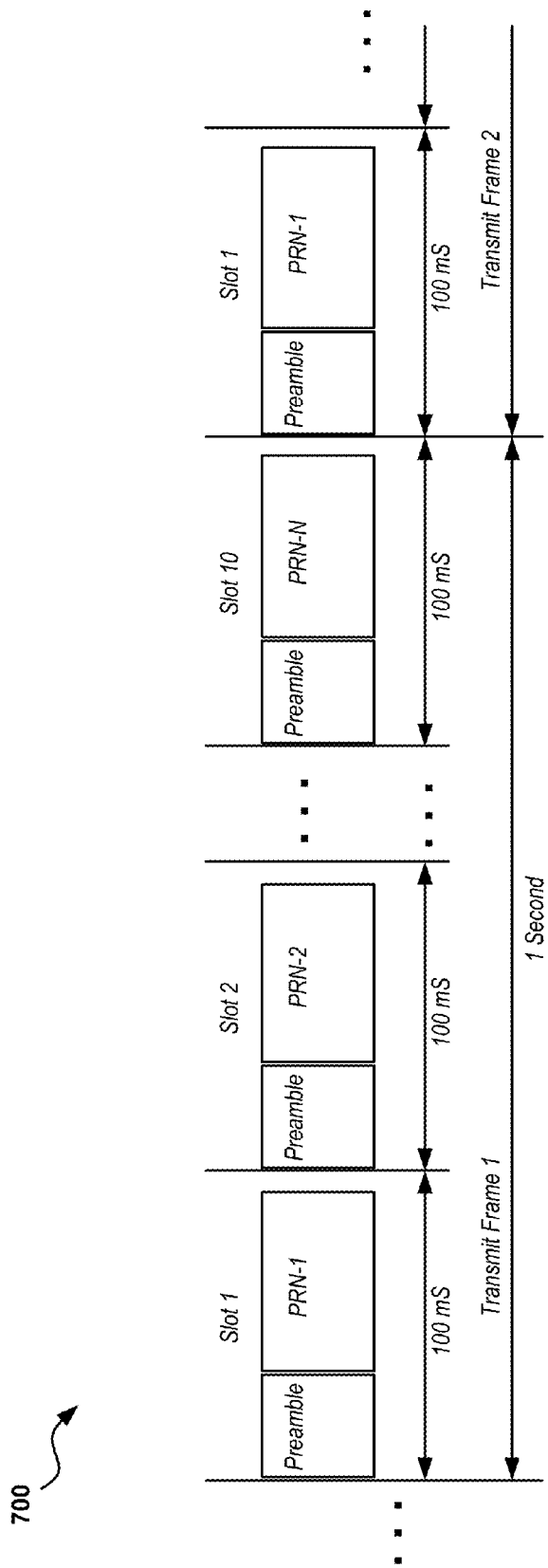
FIG. 7 illustrates details of one embodiment of an exemplary transmit frame structure in accordance with certain aspects.

Various embodiments in accordance with the disclosure here may use a burst data signaling format, also denoted herein as a WAPS DataBurst format. FIG. 7 is a block diagram of the WAPS DataBurst signal structure 700, under an embodiment. The WAPS signal structure 700 comprises ten 100 ms slots in each second, denoted as Slot 1 through Slot 10 for each Frame. It is noted that only a subset of the ten slots are shown in the example signal structure 700 for clarity, but it is noted that embodiments are not so limited.

Each WAPS transmitter, such as transmitters 110 of FIG. 1, may be assigned one of the ten slots as their primary slot, as is further described subsequently with respect to FIG. 7. The WAPS signal may be generated from a Gold code (GC) PRN sequence and BPSK spreading in an exemplary embodiment; however, other PRN sequences and/or spreading modulation may also be used in various embodiments. The chipping rate of the WAPS signal in an exemplary embodiment is 1.023 megachips/second (Mcps), however, other chipping rates may be used in various embodiments. Each Gold code has 1023 chips and lasts 1 ms in an exemplary embodiment such that each 100 ms slot can include 100 Gold code symbols, where one Gold code may be used as a guard time (also denoted herein as a "guard" for brevity) between slots and 99 Gold codes are available for ranging and data transmission in each 100 ms slot. Other slot configurations and allocations between symbols between ranging and data transmission may be used in various embodiments, and location systems may use different types of blocks, having different block types as described subsequently herein, with different allocations of symbols between data and ranging.

In an exemplary embodiment, each WAPS transmitter may transmits a preamble for up to seven Gold code durations, using PRN 7. Ranging blocks (sent in slots denoted as ranging slots) of an exemplary embodiment comprise a preamble with a length of seven (7) Gold codes, and 92 Gold codes remain for pilot symbols. Hybrid blocks (sent in slots denoted as hybrid slots) may have a preamble with a length of four (4) Gold codes, and 92 Gold codes remain for pilot and data symbols. In an exemplary embodiment, the first four symbols of the preamble may be the same in all slots; however, other embodiments may use different symbols and/or different numbers of the same symbols in the preamble. An example list of PRNs used in one embodiment is as follows: 1, 12, 31, 32, 120, 122, 127, 131, 136, and 138.

In order to be able to transmit all data required for trilateration (e.g., latitude, longitude, etc.) in a relatively short time period, and to perform long coherent integrations to enable high ranging accuracy, the WAPS of an embodiment includes the use of DataBursts. The WAPS DataBurst format generally divides the time available to a transmitter into ranging portions and data portions. During the ranging portion of the transmitter time, transmitters may transmit pilot symbols that enable long coherent integration. During the data portion of the transmitter time, transmitters may transmit data symbols at a physical-layer rate of 1 bit per Gold code period.

FIG. 8A illustrates details of example transmitter output signaling in a system such as system 100 of FIG. 1 using ranging and hybrid pilot blocks in correspondingly assigned slots. In this example, each frame is divided into 10 slots, numbered slots 1 through 10. Output signals from multiple transmitters (Transmitter/Beacons 1-n) are illustrated in this example, where transmitter 1 is allocated slot 3, transmitter 2 is allocated slot 1, transmitter n is allocated slot 5, and intermediate transmitters would be allocated other slots and/or may overlap with the allocated slots depending on the network configuration, number of transmitters, etc. It is noted that the particular slot allocation shown is provided for purposes of illustration and is not intended to be limiting as to the number of slots per frame, slot allocations, or other signaling parameters.

Starting in frame 1, transmitter 1 may send a range block 710A in slot 3, transmitter 2 may send a range block 720A in slot 1, transmitter n may send a range block 730A in slot 4, and intermediately numbered transmitters (not shown) may send a range block in their correspondingly allocated slots. As shown in FIG. 7A, transmitters may also be allocated additional slots in some embodiments—for example, transmitter 1 may be allocated a second slot (e.g., slot 7) in which to send additional blocks 713A, 715A. Other transmitters, such as transmitters 2 through N as shown, may also be allocated additional slots in some embodiments (not shown in FIG. 7A).

In frame 2, each of the transmitters 1, 2, and N may then send a second block 712A, 722A, and 732A, respectively, which may be a first hybrid block as shown in FIG. 5, in its predefined slot. The process may then repeat for successive frames. For example, each transmitter may send a second hybrid block in the next frame if $RH_1H_2$ signaling is used. It is noted that in the example signaling 700A of FIG. 7A each transmitter sends the same type of block (e.g., a range or hybrid block) within a particular frame. This may be done through transmitter coordination and synchronization, such as between transmitters 110 through server system 130 as shown in FIG. 1 or via direct intercommunication between transmitters 110, such as via network infrastructure 170.

Alternately, in some embodiments, the type of block sent by each transmitter during a particular frame may be different, either through transmitter and/or server system coordination or through each transmitter independently selecting the particular block type to transmit in each frame. One example of such a staggered transmitter block type signaling structure is illustrated in signaling 700B of FIG. 7B. In this example signaling, transmitter 1 sends a range block 710B in frame 1, while transmitter 2 sends a hybrid block 720B, which may be a first hybrid block of an $RH_1H_2$ signal, and transmitter n sends a hybrid block 730B. In frame 2, transmitter 1 may then send a hybrid block 712B, which may be a first hybrid block if $RH_1H_2$ signaling is used, transmitter 2 may send a second hybrid block 722B, and transmitter n may send a range block 720B, as shown.

FIGS. 9-11 illustrate details of example embodiments of block signaling formats. For example, FIG. 9 illustrates details of an embodiment of a range block 900. Range block 900 includes a range preamble signal component 910, a range pilot signal component 920, and an option guard signal component 920. Guard signal component 920 may be a particular code or symbol or symbols or may be an off or blank signal (e.g., where nothing is transmitted). FIG. 10 illustrates details of an embodiment of a hybrid block 1000. Hybrid block 1000 may include a hybrid pilot signal component 1010, which is typically shorter than the range preamble signal component 910 of FIG. 9. Hybrid block 1000 may further include a hybrid pilot and data signal component 1020, as well as an optional guard signal component 1030, which may be an off or blank signal. FIG. 11 illustrates details of an example range preamble signal 1100, which may correspond with range preamble 910 of FIG. 9. In particular, range preamble 1100 may include a hybrid preamble component 1110, which may be the same as hybrid preamble 1010, as well as an additional preamble signal component 1120 as shown. Alternately, in some embodiments, a range preamble such as range preamble 910 may be completely different from hybrid preamble 1010.

Figure 12:
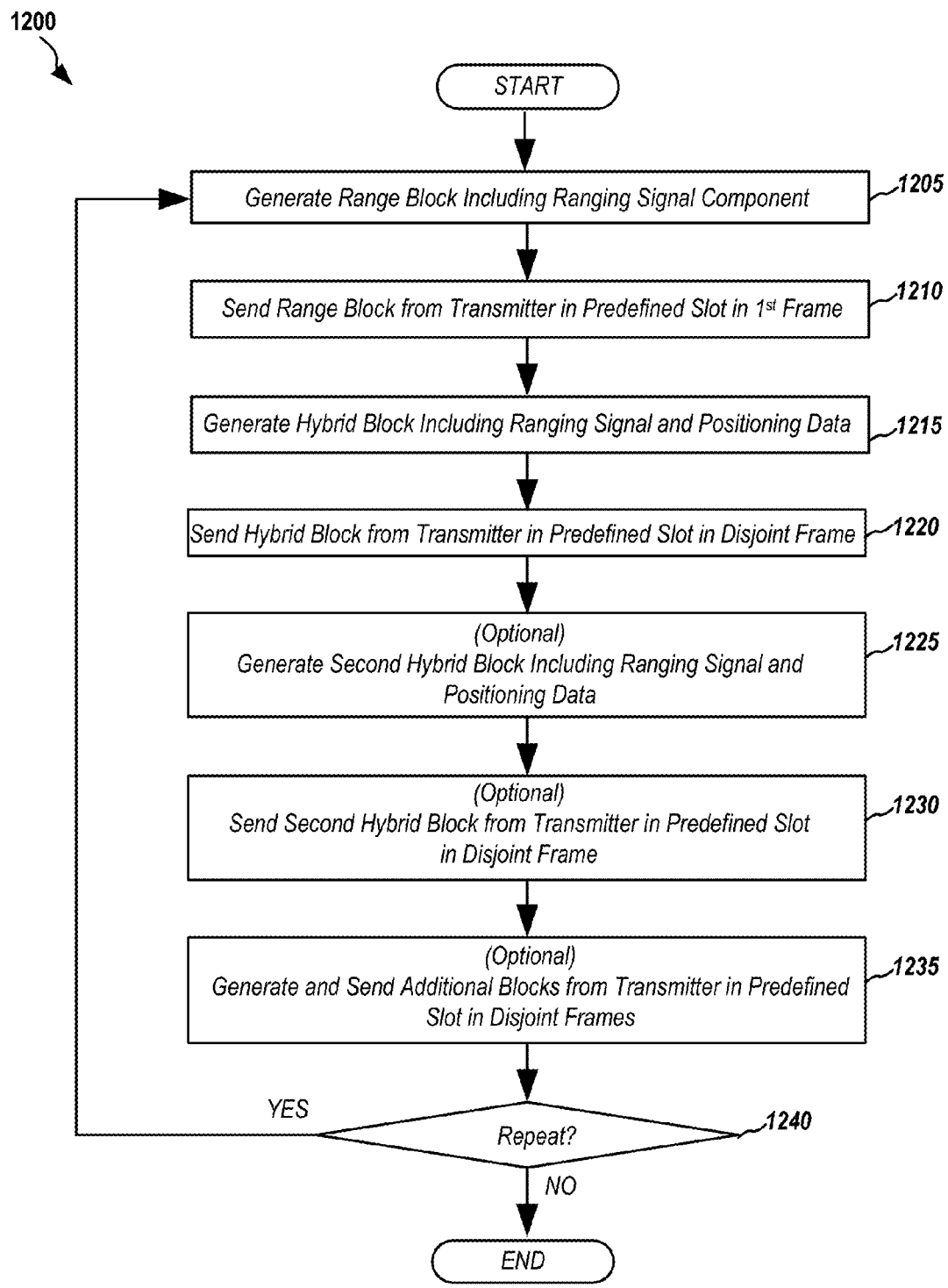
FIG. 12 illustrates details of one embodiment of a process for generating transmitter location/positioning output signaling in accordance with certain aspects.

FIG. 12 illustrates details of an embodiment of a process 1200 for generating and sending transmitter output signals in a position/location system, such as system 100 as shown in FIG. 1. Process 1200 may be implemented in a transmitter such as transmitters 100 as shown in FIG. 1. At stage 1205 a range block including a ranging signal component may be generated in or received at a transmitter, such as one of transmitters 110 as shown in FIG. 12. At stage 1210, the range block may be sent from the transmitter to one or more receivers, such as user devices 120 as shown in FIG. 1. The range block may be sent in a first predefined slot of a plurality of predefined slots comprising a first frame. At stage 1215, a hybrid block, which may include a ranging signal and a positioning signal including positioning data and/or other data or information, may be generated. At stage 1220, the hybrid block may be sent from the transmitter to one or more receivers. The hybrid block may be sent in the first predefined slot in a transmit frame that may be disjoint from the first frame. The disjoint frame may be one or more subsequent frames or one or more previous frames. In an exemplary embodiment the disjoint frame is the frame subsequent to the first frame; however, in other embodiments the disjoint frame may be offset by two or more frames from the first frame.

Process 1200 may further include, for example, generating, at the transmitter, a second hybrid block at stage 1225, and sending, from the transmitter, the second hybrid block at stage 1230. The second hybrid block may be sent in the first predefined slot in a third transmit frame. The third transmit frame may be disjoint from the first and/or the second transmit frames. One or more additional blocks may subsequently be generated and sent at stage 1235, such as one or more additional hybrid blocks. A decision stage 1240 may be implemented to determine if the transmission process is to be repeated. Typically the process 1200 will be repeatedly indefinitely, in which case process execution may return to stage 1205 and repeat.

The ranging signal sent from the transmitter may include, for example, a first random pseudo-noise (PRN) sequence. The ranging signal sent from the transmitter may be sent with no frequency offset in the transmitter signal or at a first frequency offset in the transmitted signal.

The range block sent from the transmitter may include, for example, a range preamble signal and a range pilot signal. The range block sent from the transmitter may include a guard signal or guard band. The guard signal may comprise a gold code sequence. The guard signal may be a blank or off signal for at least a portion of a guard time period between slots.

The hybrid block sent from the transmitter may include, for example, a hybrid preamble signal. The range preamble may include the hybrid preamble signal and an additional preamble signal. The hybrid block sent from the transmitter may include a hybrid preamble signal and a first set of data. The hybrid block sent from the transmitter may further include a hybrid pilot signal. The range preamble signal may be sent with no transmit frequency offset or a first transmit frequency offset. The range pilot signal may be sent with no transmit frequency offset or a second transmit frequency offset. The second transmit frequency offset may be the same as or may be different than the first transmit frequency offset. The hybrid preamble signal may be sent with no frequency offset or a first transmit frequency offset. The first set of data may be sent with no frequency offset or a second transmit frequency offset. The second transmit frequency offset may be the same as or may be different than the first transmit frequency offset.

The hybrid block sent from the transmitter may, for example, include data associated with a location of the transmitter. The data associated with a location of the transmitter may include positional data, such as latitude and/or longitude data or other positional coordinate data or information, in one, two, or three dimensions. The data associated with the location of the transmitter includes altitude information or data usable to determine altitude information, such as pressure and/or temperature data in the proximity of the transmitter, GPS data, or other altitude-related data or information.

The data associated with the location of the transmitter may include transmitter identification information. The transmitter identification information may be information such as a transmitter identification number or numbers, system information or data assigned to or allocated to the transmitter, network information, user device information, security, encryption, or other information related to characteristics of signals being sent or received by the transmitter, or other related transmitter information. The data associated with the location of the transmitter includes altitude information or data usable to determine altitude information, such as pressure and/or temperature data in the proximity of the transmitter, GPS data, or other altitude-related data or information.

The hybrid block sent from the transmitter may include, for example, data associated with an environmental condition in the proximity of the transmitter. The data associated with an environmental condition may include pressure, temperature information, humidity information and/or other environmental information.

The hybrid block sent from the transmitter may include, for example, data associated with a reference time and/or a reference time correction associated with the first transmitter. The reference time correction may include data defining a time offset of the transmitter data from a reference time or times. The hybrid block sent from the transmitter may include data associated with a transmit quality metric associated with the transmitter. The transmit quality metric may be signal quality metric or other data or information associated with data traffic or wireless communication channel characteristics in the vicinity of the transmitter.

The hybrid block sent from the transmitter may include, for example, data associated with a packet type of the hybrid block. The hybrid block sent from the transmitter may include encrypted data. The hybrid block sent from the transmitter may include data with error control coding. The error control coding may comprise convolutional encoding. The hybrid block sent from the transmitter may include cyclical redundant checking (CRC) data.

The transmit frames may have a duration of one second or approximately one second. The plurality of predefined slots per frame may consist of ten slots. In other embodiments the transmit frame may have a duration greater or less than one second, and more than or fewer than 10 slots may within each frame. The first transmit frame may be sent using binary phase shift keying (BPSK) or quadrature phase shift keying (QPSK). In other embodiments different modulation methods, such as OQPSK, MSK, OFDM, ASK, QAM, and/or other modulation schemes may be used.

The hybrid block sent from the transmitter may include a plurality of data symbols. In an exemplary embodiment, the plurality of data symbols may consist of ninety nine data symbols. The hybrid block may further include a guard signal. The guard signal may be a blank or off signal. The hybrid block may include a preamble. In an exemplary embodiment the preamble may consist of seven symbols.

Figure 13:
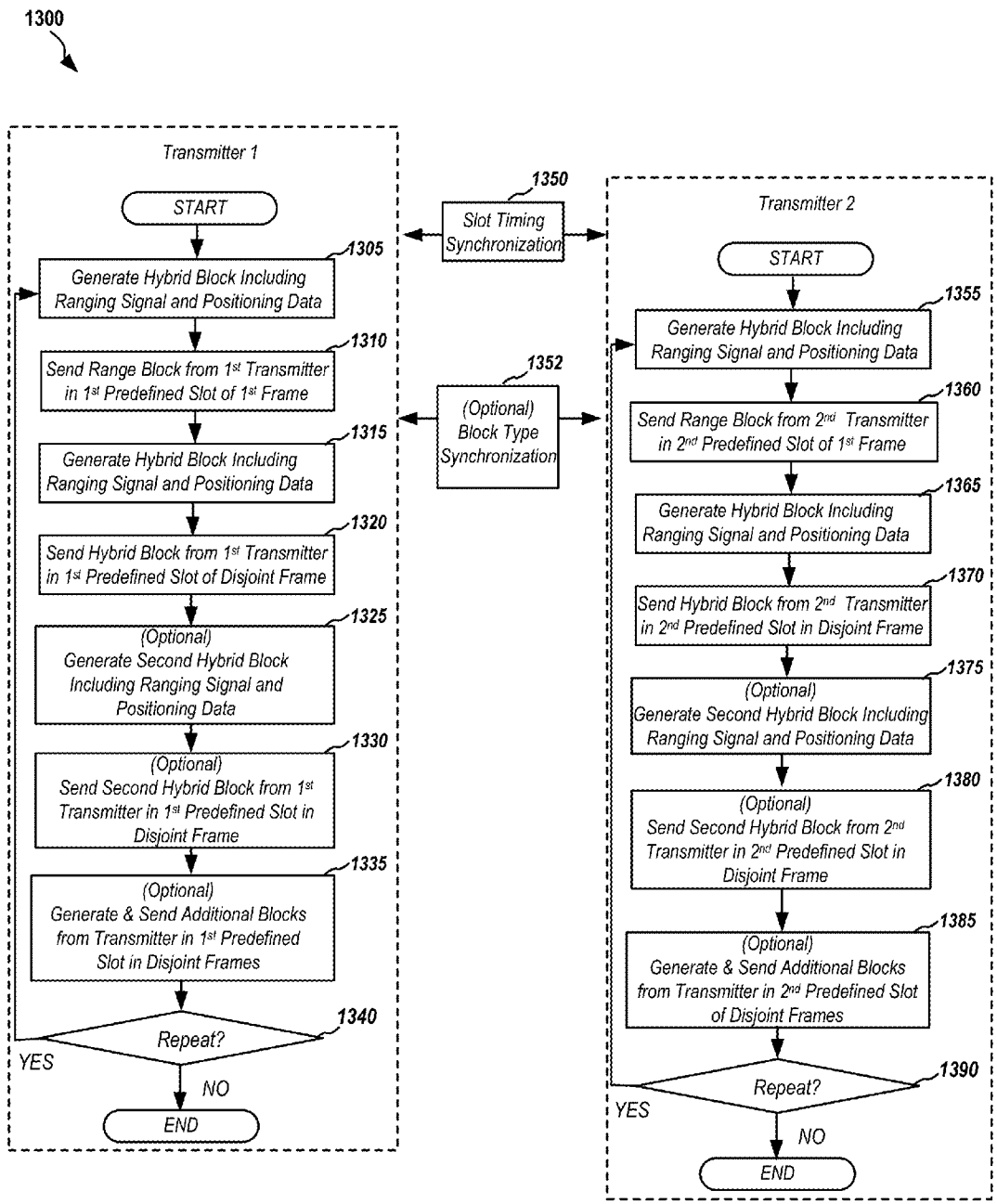
FIG. 13 illustrates details of one embodiment of a process for generating multi-transmitter location/positioning output signaling in accordance with certain aspects.

FIG. 13 illustrates details of an embodiment of a process 1300 for transmission of positioning/location signals from multiple transmitters (in this example only two are illustrated for clarity, however, in a typical implementation three or more transmitters will be used to facilitate trilateration), such as two of the transmitters 110 as shown in FIG. 1. In process 1300, two transmitters, denoted as transmitter 1 and transmitter 2, send transmitter output signals simultaneously. The signaling is typically synchronized to at least the level of slot timing so that each transmitter is synchronized to send signals only it its designated slot, as described previously herein. The transmitters may be time synchronized for slot timing by receiving time reference data from systems such as a GPS system, such as GPS satellites 150 as shown in FIG. 1, a server system, such as server system 130 as shown in FIG. 1, via network infrastructure 170, and/or between themselves, such as through a synchronization stage 1350 as shown in FIG. 13. In addition, the transmitters may be synchronized to send the same type of block in each frame, such as, for example, by synchronizing all transmitters to send a range block in frame 1, a first hybrid block in frame 2, a second hybrid block in frame 3, etc. This may be done through a block type synchronization stage 1352 as shown, wherein the transmitters synchronize to send the same type of block in a given frame. Alternately, the transmitters may not be block synchronized but may just transmit the next successive block in their respective signaling sequence during their allocated predefined slot. In the example process embodiment 1300 as shown in FIG. 13 it is assumed that the transmitters are block synchronized and therefore generate the same type of blocks for transmission in a particular frame; however, in other embodiments the block generation sequences would be offset accordingly based on the particular block sequence of each transmitter.

In operation, as shown in FIG. 13, each of transmitters 1 and 2 may perform the same or similar processing stages to those described in FIG. 12, which may or may not be synchronized to the block type level. In particular, at stages 1305 and 1355, respectively, ranging blocks, which may include a ranging signal component may be generated in or received at each transmitter, such as two of the transmitters 110 as shown in FIG. 12. At stages 1310, 1360, respectively, the range block may be sent from the transmitters to one or more receivers, such as user devices 120 as shown in FIG. 1. The range block for the first transmitter may be sent in a first predefined slot of a plurality of predefined slots comprising a first frame, while the range block for the second transmitter may be sent in a second predefined slot of the plurality of predefined slots in the same frame. At stages 1315, 1365, respectively, hybrid blocks, which may include ranging signals and positioning signals including positioning data and/or other data or information, may be generated. At stage 1220, the hybrid blocks may be sent from the transmitters to one or more receivers in their respective predefined slots. For example, the hybrid block may be sent from the first transmitter in the first predefined slot in a transmit frame that may be disjoint from the first frame, while the hybrid block from the second transmitter may be sent in the second predefined slot, also in a disjoint transmit frame. The disjoint transmit frames may be one or more subsequent frames or one or more previous frames. In an exemplary embodiment the disjoint frame is the frame subsequent to the first frame; however, in other embodiments the disjoint frame may be offset by two or more frames from the first frame.

Process 1300 may further include, for example, generating, at the transmitters, a second pair of hybrid blocks at stages 1325, 1375, respectively, and sending, from the transmitters, the second hybrid blocks at stage 1330, 1380, respectively. The second hybrid blocks may be sent in the first and second predefined slots in a third transmit frame. The third transmit frame may be disjoint from the first and/or the second transmit frames. One or more additional blocks may subsequently be generated and sent from the two transmitters at stage 1335, 1385, respectively, such as one or more additional hybrid blocks or other block types. A decision stage 1240 may be implemented to determine if the transmission process is to be repeated. Typically the process 1200 will be repeatedly indefinitely, in which case process execution may return to stage 1205 and repeat.

The ranging signal sent from the transmitter may include, for example, a first random pseudo-noise (PRN) sequence. The ranging signal sent from the second transmitter may include a second PRN sequence. The first PRN sequence may be the same as or different from the second PRN sequence. The ranging signal sent from the transmitter may be sent with no frequency offset in the transmitter signal or at a first frequency offset in the transmitted signal. The ranging signal sent from the second transmitter may be sent at no frequency offset or at a second frequency offset. The first frequency offset may be the same as or different than the second frequency offset. The range block may be sent from the second transmitter in the first frame or in a frame disjoint from the first frame.

The range blocks sent from the transmitters may include, for example, a range preamble signal and a range pilot signal. The range blocks sent from the transmitters may include a guard signal or guard band. The guard signal may comprise a gold code sequence. The guard signal may be a blank or off signal for at least a portion of a guard time period between slots.

The hybrid blocks sent from the transmitters may include, for example, a hybrid preamble signal. The range preamble may include the hybrid preamble signal and an additional preamble signal. The hybrid blocks sent from the transmitters may include a hybrid preamble signal and a first set of data. The hybrid blocks sent from the transmitters may further include a hybrid pilot signal. The range preamble signal may be sent with no transmit frequency offset or a first transmit frequency offset. The range pilot signal may be sent with no transmit frequency offset or a second transmit frequency offset. The second transmit frequency offset may be the same as or may be different than the first transmit frequency offset. The hybrid preamble signal may be sent with no frequency offset or a first transmit frequency offset. The first set of data may be sent with no frequency offset or a second transmit frequency offset. The second transmit frequency offset may be the same as or may be different than the first transmit frequency offset.

The hybrid blocks sent from the transmitters may, for example, include data associated with a location of the respective transmitters. The data associated with a location of the transmitters may include positional data, such as latitude and/or longitude data or other positional coordinate data or information, in one, two, or three dimensions. The data associated with the location of the transmitters may include altitude information or data usable to determine altitude information, such as pressure and/or temperature data in the proximity of the transmitter, GPS data, or other altitude-related data or information.

The data associated with the location of the transmitters may include transmitter identification information for the respective transmitters. The transmitter identification information may be information such as a transmitter identification number or numbers, system information or data assigned to or allocated to the transmitter, network information, user device information, security, encryption, or other information related to characteristics of signals being sent or received by the transmitter, or other related transmitter information. The data associated with the location of the transmitters may include altitude information or data usable to determine altitude information, such as pressure and/or temperature data in the proximity of the transmitter, GPS data, or other altitude-related data or information.

The hybrid blocks sent from the transmitters may include, for example, data associated with an environmental condition in the proximity of the respective transmitters. The data associated with an environmental condition may include pressure, temperature information, humidity information and/or other environmental information.

The hybrid block sent from the transmitters may include, for example, data associated with a reference time and/or a reference time correction associated with the transmitters. The reference time correction may include data defining a time offset of the transmitter data from a reference time or times. The hybrid blocks sent from the transmitters may include data associated with a transmit quality metric associated with the transmitter. The transmit quality metric may be signal quality metric or other data or information associated with data traffic or wireless communication channel characteristics in the vicinity of the transmitter.

The hybrid blocks sent from the transmitters may include, for example, data associated with a packet type of the hybrid block. The hybrid blocks sent from the transmitters may include encrypted data. The hybrid blocks sent from the transmitters may include data with error control coding. The error control coding may comprise convolutional encoding. The hybrid blocks sent from the transmitters may include cyclical redundant checking (CRC) data.

The range blocks sent from the transmitters may include, for example, a preamble and a first transmitter sequence encoded with a first spreading code. The range block sent from the second transmitter may include the preamble and a second transmitter sequence. The second transmitter sequence may be encoded with a second spreading code. The second spreading code may be the same as or different than the first spreading code. The first and second spreading codes may be Gold codes. The Gold codes may be different codes. The first and second spreading codes may be other spreading codes.

The transmit frames may have a duration of one second or approximately one second. The plurality of predefined slots per frame may consist of ten slots. In other embodiments the transmit frame may have a duration greater or less than one second, and more than or fewer than 10 slots may within each frame. The first transmit frame may be sent using binary phase shift keying (BPSK) or quadrature phase shift keying (QPSK). In other embodiments different modulation methods, such as OQPSK, MSK, OFDM, ASK, QAM, and/or other modulation schemes may be used.

The hybrid blocks sent from the transmitters may include a plurality of data symbols. In an exemplary embodiment, the plurality of data symbols may consist of ninety nine data symbols. The hybrid blocks may further include a guard signal. The guard signal may be a blank or off signal. The hybrid blocks may include a preamble. In an exemplary embodiment the preamble may consist of seven symbols.

The hybrid block sent from the transmitter may include, for example, a first portion of data associated with a transmitter parameter, and the second hybrid block may include a second portion of data associated with the transmitter parameter. The first portion of data may represent a first lowered resolution value of the transmitter parameter, and the second portion of data represents a second lowered resolution value of the transmitter parameter. The first lowered resolution value and the second lowered resolution value may be the same lowered resolution values or may be different lowered resolution values. The first lowered resolution value and the second lowered resolution value may be selected so as to be usable in combination to generate a higher resolution value at a receiver. The transmitter parameter may be a position value. The position value may be a longitude value. The position value may be a latitude value. The position value may be an alternate location coordinate value. The position value may be an altitude value. The transmitter parameter may be an environmental parameter value in proximity to the transmitter. The environmental parameter may be a temperature value. The environmental value may be a pressure value.

Figure 14:
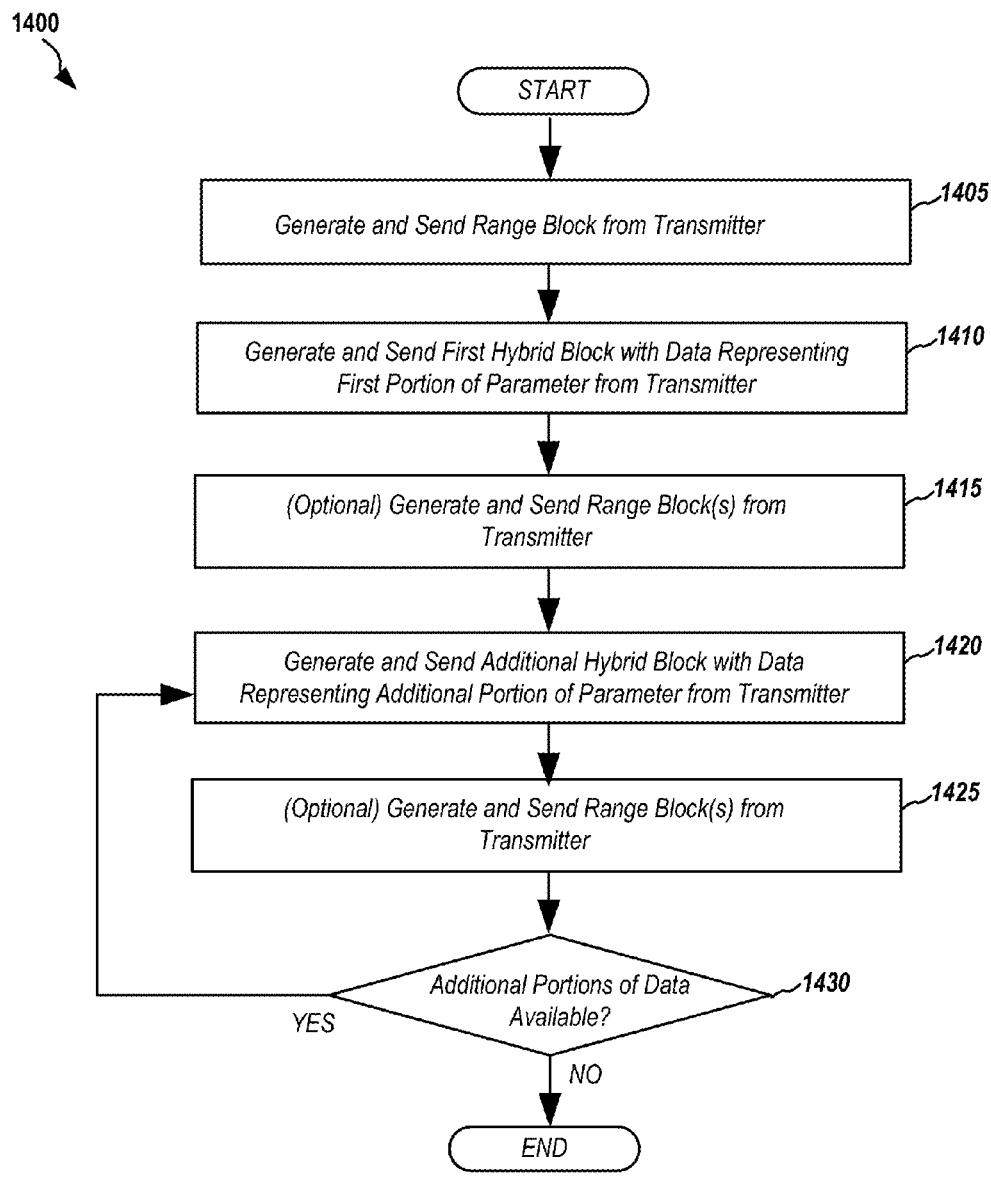
FIG. 14 illustrates details of one embodiment of a process for transmitting temporally distributed resolution (TDR) data.

In some embodiments, data may be sent from a transmitter to a receiver/user device using a format described herein as temporally distributed resolution (also denoted as TDR). In a TDR implementation, data is sent from a transmitter, such as transmitters 110 of FIG. 1, in blocks of lowered resolution data, which may then be combined at a receiver, such as user device 120 of FIG. 1, to generate higher resolution data. FIG. 14 illustrates an example embodiment of a process 1400 for generating DataBurst TDR transmitter output signals at a transmitter. At stage 1405, the transmitter may send a range block, such as described previously herein, as part of a DataBurst transmit sequence. At stage 1410, the transmitter may measure or determine data to be sent, such as positional data or other data, and/or may retrieve the data from a stored memory, such as memory 220 of FIG. 2, and may then divide the data into two or more portions. Each of the portions may be at a lowered resolution with respect to the source data. At stage 1410, a first portion of the data may be sent from the transmitter, such as in a hybrid block as described previously herein. The hybrid block may be a first hybrid block of a sequence of blocks, such as an $RH_1H_2$ sequence as described previously.

Subsequent transmission of additional portions of the lowered resolution data may be sent sequentially, such as in the second hybrid block of a $RH_1H_2$ sequence; however, the subsequent portions need not be so constrained and may be sent in later frames, etc. In this case, for example, an optional range block or blocks may be sent at stage 1415, and/or other hybrid blocks containing other data may also be sent before the remaining portions of the lowered resolution data are transmitter. At stage 1420, an additional portion of the lowered resolution data may be sent, such as in another hybrid block. Optionally at stage 1425, other range and/or hybrid blocks may be subsequently sent. A decision may be performed at stage 1430 to determine whether additional portions need to be sent. If so, the processing may return to stage 1425 to send one or more additional portions. Alternately, processing may end if no further portions need to be sent. In some implementations, no decision stage is used, such as when a fixed number of portions are defined for transmission in a corresponding number of hybrid blocks.

As an example of how TDR may be used to send multiple blocks of lowered resolution data, in an exemplary embodiment, the number of bits used to transmit information necessary for trilateration is approximately 109. Example trilateration information includes data defining transmitter latitude, longitude, altitude, temperature, pressure, transmitter correction, transmitter quality, and framing overhead. This is illustrated in Table 1500A of FIG. 15A. One TDR embodiment reduces the number of information bits required per slot from approximately 109 to approximately 102, and send multiple transmissions of the 109 bit data, reduced to 102 bits, where it may then be restored at the receiver/user device. The motivation for reducing the number of information bits per slot is so the transmitter can reduce the number of bits to match what the channel can support, while still enabling full resolution over time. In this example, there is still enough data transmitted in each slot (e.g., in a hybrid block sent in a corresponding predefined slot from the transmitter) to do a meter-level accuracy fix, therefore providing a fast time to first fix (Fast TTFF). Moreover, by sending multiple blocks with various lowered resolution versions of the data, full accuracy (e.g., 109 bit accuracy in this case) can be achieved at the receiver over time.

FIG. 15B illustrates a table 1500B that includes trilateration information or parameters for another embodiment. This alternative embodiment reduces the number of information bits required per slot from approximately 109 to approximately 94. While reducing the number of bits required and, consequently re-doing the resolution, this alternative still provides meter-level resolution in the various trilateration parameters.

Through use of temporally-distributed resolution at an appropriate reduced bit-resolution level, in each data slot (e.g., each hybrid block), enough data is sent to do a fix with meter-level accuracy in the various parameters, which leads to a fast TTFF. Furthermore, over multiple slots, there is enough information to reach the full accuracy of each parameter, which leads to full accuracy over time.

Further details of an exemplary embodiment of processing to implement TDR is described below. It is noted that the temporally-distributed resolution described herein works in binary as well as decimal, but the example that follows uses decimal digits for clarity. This example assumes a desire to transmit an integer representing some distance with centimeter accuracy. So, for example, 5232 represents 52.32 meters.

Also, it is assumed that only three decimal digits are transmitted each time. For example, the embodiment can only transmit a numeric string like 523, which gives decimeter-level (0.1 m) accuracy. The solution for transmitting with these restrictions while enabling centimeter accuracy at the mobile receiver is to transmit the same information multiple times, with minor adjustments in each transmit period, so that the aggregate result has the desired accuracy.

Using the example above, FIG. 16 illustrates a table 1600 that includes the transmit information for each of multiple transmit periods (e.g, transmission of multiple hybrid blocks, such as shown in FIG. 14), under an embodiment. Transmit periods 1-3, 5-7, 9, and 10 each transmit the value "523," while transmits periods 4 and 8 transmit the value "524." Following transmit period N, the receiver may compute a higher resolution value estimate as follows:

$$\text{value} = (\text{sum}_{\{k=1:N\}} tx\_\text{value}[k]) * 10/N.$$

FIG. 17 illustrates a table 1700 that includes results of the receiver calculations for the transmit information of the example, under an embodiment. The receiver results show that after four (4) transmit periods, the error drops to approximately 1 cm, and after nine (9) transmit periods, the error drops to approximately zero, which demonstrates the achievement of centimeter-level accuracy. Using the above example, if the transmit period is two (2) seconds, then within two (2) seconds the receiver has enough information to perform a rough position highest accuracy fix (e.g., centimeter level accuracy).

This TDR method of sending multiple lower resolution data portions as described above can readily be translated to binary representations of numbers as well. For example, using a value having a length of 20 bits, with 4 bits accuracy (i.e. the value is in $\frac{1}{16}^{th}$ of a meter or other unit), then one of the following transmit schemes can be used: transmit 19 bits, with 3 bits accuracy each time and 4 bits accuracy after 2 transmissions; transmit 18 bits, with 2 bits accuracy each time and 4 bits accuracy after 4 transmissions; transmit 17 bits, with 1 bits accuracy each time and 4 bits accuracy after 8 transmissions. Therefore, the number of bits transmitted each time can be reduced by 3 bits (17 bits instead of 20 bits) and, assuming a transmit period of two (2) seconds, the accuracy realized is as follows: 1 bit accuracy after 2 seconds; 2 bit accuracy after 4 seconds; 3 bit accuracy after 8 seconds; full 4-bit accuracy after 16 seconds.

Figure 18:
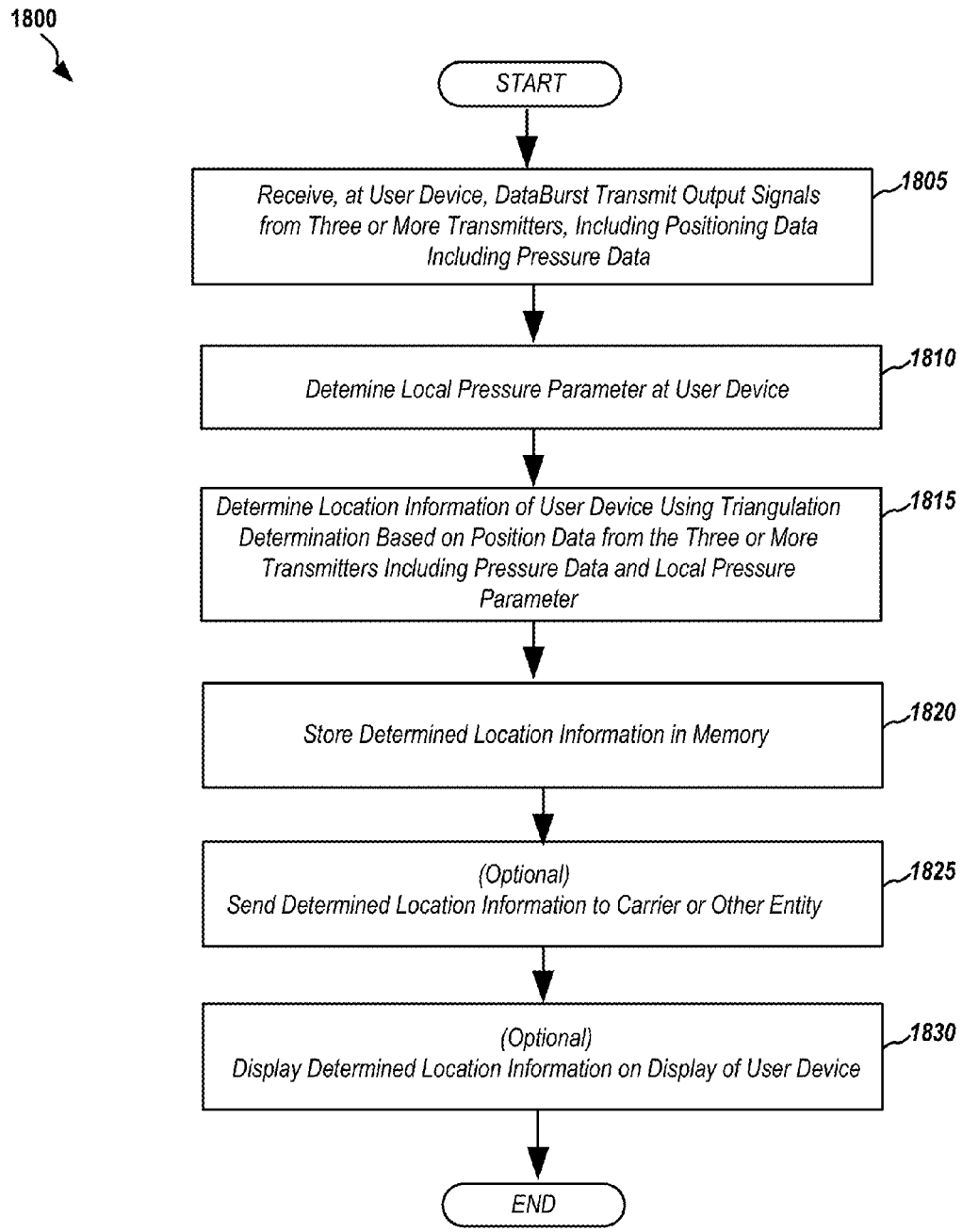
FIG. 18 illustrates details of one embodiment of a process for receiving and processing TDR data at a receiver/user device.

Once DataBurst signals have been sent from transmitters to receivers, such as from multiple transmitters 110 to user device 120 as shown in FIG. 1, the receivers may then receive the DataBurst signals and process them to determine a position/location of the receiver. In an exemplary embodiment, trilateration may be used with signals received from three or more transmitters. FIG. 18 illustrates details of an embodiment of a process 1800 for determining position information at a receiver, such as user device 120 of FIG. 1, which may be configured as shown in device 300 of FIG. 3, based on multiple received trilateration signals. At stage 1805, the receiver may receive trilateration signals in a DataBurst format, such as described previously herein, from three or more transmitters. These transmitter signals include data sufficient to determine, based on trilateration, a position of the receiver. Pressure data, determined at the transmitters, such as through module 270 of FIG. 2, and sent from the transmitters, may be used in conjunction with locally measured pressure data at the receiver, such as may be determined in module 370 of FIG. 3 at stage 1810, to determine altitude of the receiver. For example, the altitude may be determined at the receiver based on a known altitude of the transmitter, which may be sent from the transmitter as data, along with a determined pressure differential, which, if the transmitters are in close enough proximity to the receivers, may be assumed to be under the same environmental pressure conditions, thereby allowing altitude determination based on a pressure difference between the transmitter pressure and local receiver pressure data.

At stage 1815, location of the user device, which may be done in three dimensions (e.g., latitude, longitude, and altitude, or in equivalent parameters other three-dimensional coordinate systems). In an exemplary embodiment, the location information may be determined using pressure data as described above; however, in other embodiments location may be determined based on trilateration information alone or through use of other data, such as may be provided by server system 130 of FIG. 1. At stage 1825, the determined location information may be stored in a memory of the receiver, such as in memory 320 of FIG. 3. Optionally, the determined information may be sent to a carrier or other entity at stage 1825, such as through cellular/wireless module 350, and/or may optionally be displayed at stage 1830, such as on display 390.

Figure 19:
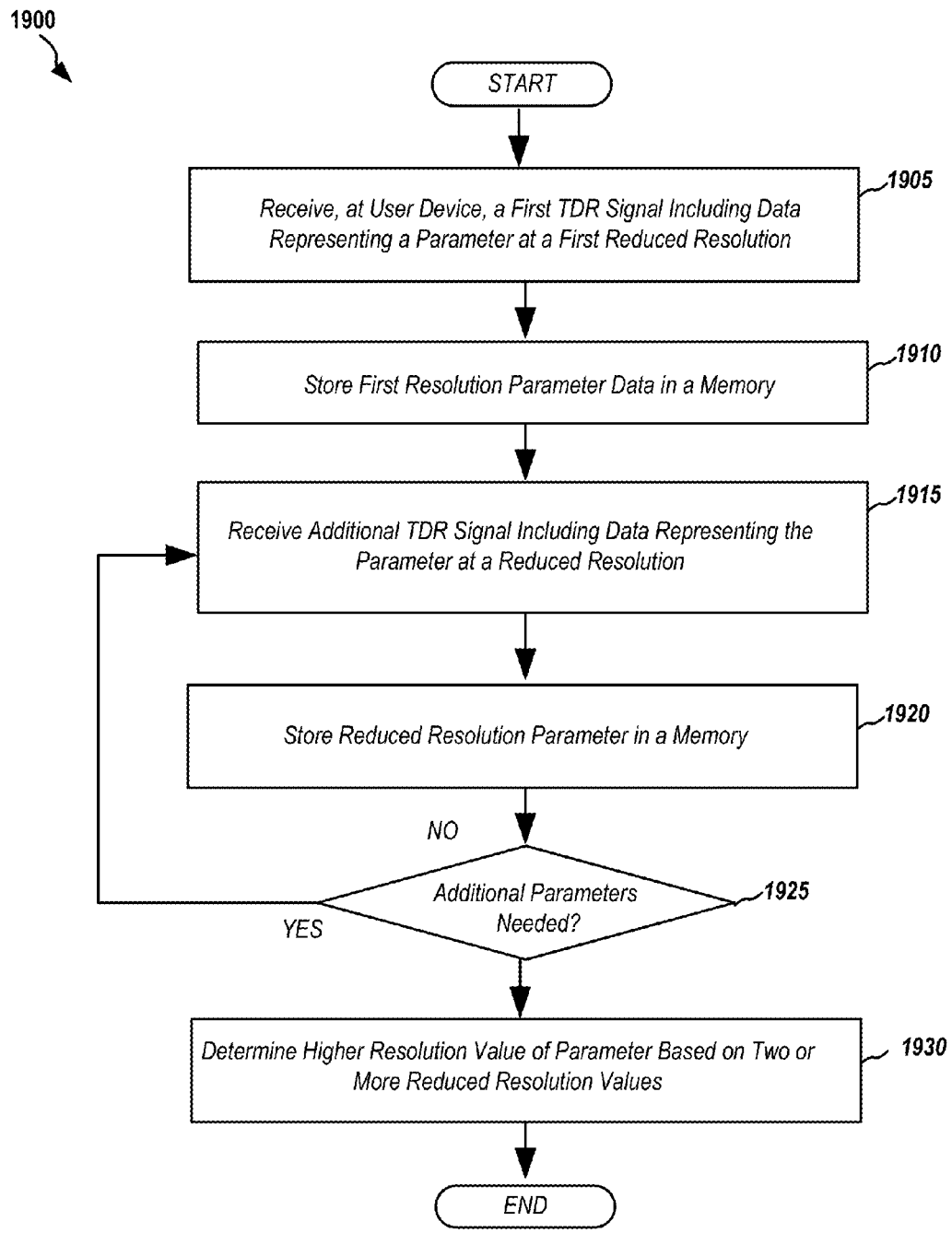
FIG. 19 illustrates details of one embodiment of a process for generating higher resolution data at a receiver/user device based on multiple reduced resolution TDR data packets.

FIG. 19 illustrates details of an embodiment of a process 1900 for processing temporally distributed data (TDR) received at a receiver/user device, such as user device 120 as shown in FIG. 1. At stage 1905, a first transmitter output signal including data representing a parameter at a first reduced resolution may be received at the receiver/user device. The received signal may be, for example, in a first hybrid packet. The data may be extracted from the incoming signal and stored in a memory, such as memory 320 as shown in FIG. 3, at stage 1910. At stage 1915, another signal may be received with data representing the parameter at a reduced resolution, which may be at a different reduced resolution value than the first packet. This packet may be, for example, a second hybrid packet in an $RH_1H_2$ DataBurst signaling sequence. The additional reduced resolution parameter may likewise be extracted and stored in a memory at stage 1920.

In some embodiments, the reduced resolution values may be continuously added to a cumulative higher resolution estimate of the parameter, or, in other embodiments, a decision stage 1925 may be included to determine whether additional lower resolution packets should be received before determining an estimate of the higher resolution parameter value. In this case, if additional lower resolution packets are needed, the process may repeat from stage 1915 until sufficient packets have been received.

At stage 1930, a higher resolution value of the parameter may then be determined, such as described previously with respect to FIGS. 15-17, at stage 1930.

FIG. 20 illustrates details of a set of example packet payload parameters and values in table 2000, accordance with an exemplary embodiment. Example parameters may include, for example, latitude, longitude, altitude, pressure, temperature, transmitter IDs, timing information, such as GPS timing, security information, encryption information, and/or other information.

Figure 21:
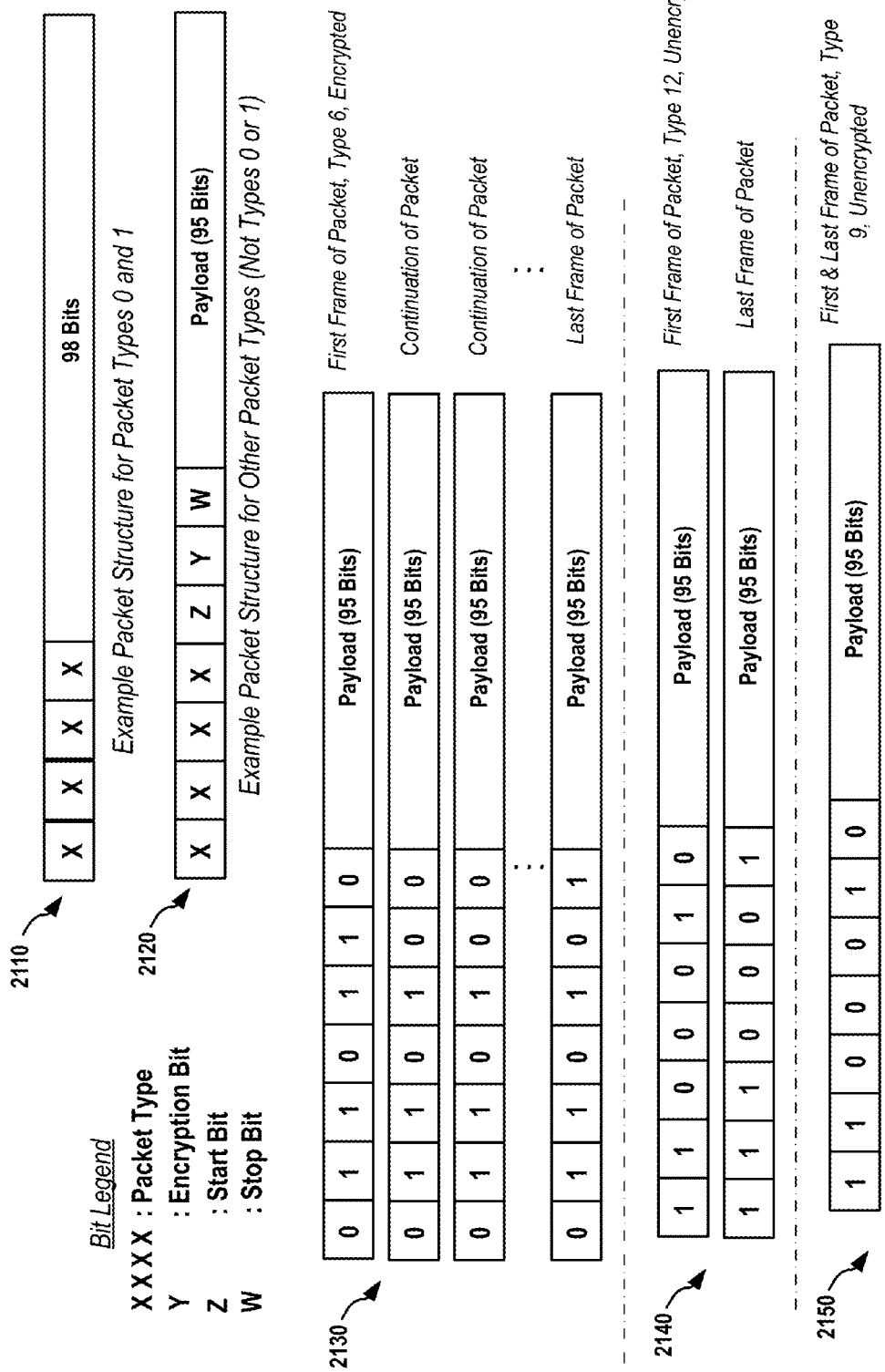
FIG. 21 illustrates details of an embodiment of data packet structure and example data packets as may be used to send transmitter output data signals in an exemplary embodiment.

FIG. 21 illustrates details of packet formats and header values in accordance with an exemplary embodiment. In this exemplary embodiment, two packet types, shown as packet types 0 or 1 (2110) and all other packet types (2120) may be used. Bits of a packet header may be formatted as shown, e.g., including a packet type, encryption bit(s), start and stop bits, and/or other header data or information (not shown). Sequence 2130 illustrates one example of packets transmitted in accordance with this packet formatting. In particular, example start and stop frame packets, along with intermediate payload packets, are shown. These may be, for example, sent as hybrid packets, such as hybrid 1, hybrid 2 packets as described previously herein. Sequences 2140 and 2150 illustrate other example packets.

Figure 22:
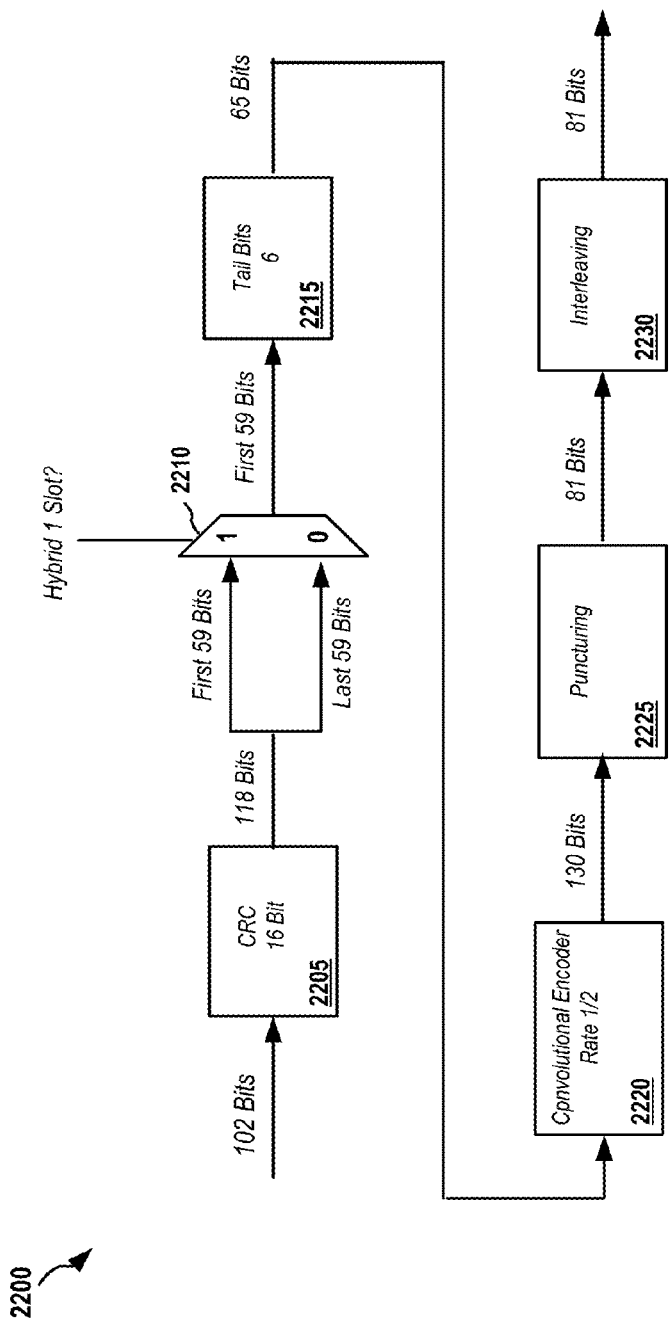
FIG. 22 illustrates details of an embodiment of encoder circuitry that may be used to encode output data for transmission as a transmitter output data signal in an exemplary embodiment.

FIG. 22 illustrates details of an embodiment of a convolution encoder circuit 2200 that may be used to generate transmitter output signals, such as in transmitters 110 as shown in FIG. 1. In the example embodiment, data may be received, such as a 102 bit sequence for transmission as described previously herein, and may have a CRC applied at stage 2205, resulting in a bit stream of 118 bits. This may be divided into two bit sequences at multiplexer 2210, and tail bits may be added at block 2215, resulting in an outgoing bit sequence of 65 bits. A convolutional encoder 2220, which may have a rate of 1/2, may then encode the bit stream, resulting in an output sequence of 130 bits. These may be punctured and interleaved to provide 80 output bits. Encoder embodiment 2200 is shown for purposed of illustration, not limitation, and it will be apparent that other encoding circuits and configurations may be used in various other embodiments.

Figure 23:
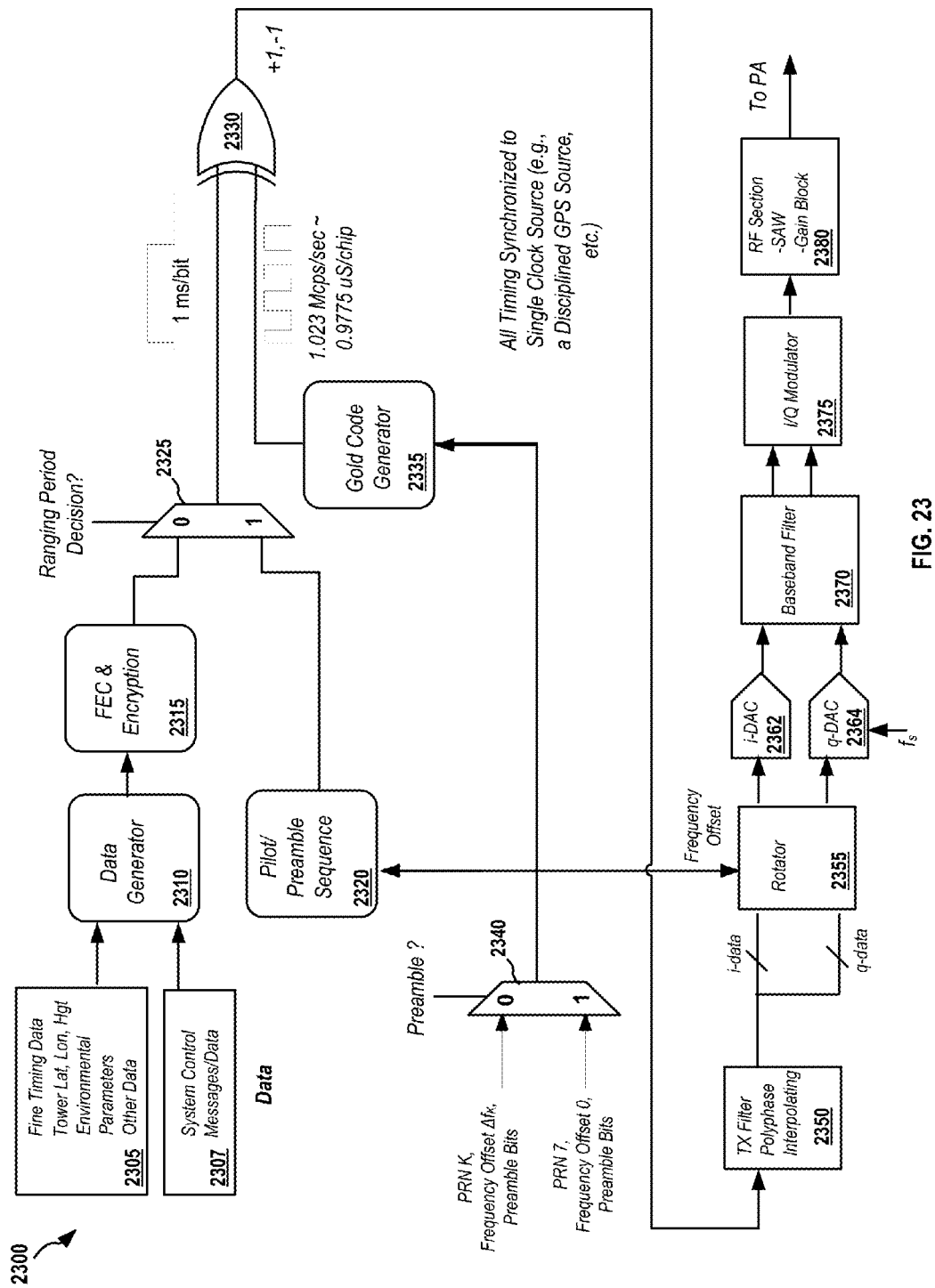
FIG. 23 illustrates details of an embodiment of a circuit for generating output data for transmission as a transmitter output signal in an exemplary embodiment.

FIG. 23 illustrates details of an embodiment of a circuit 2300 for encoding and modulating data for transmission as an output signal, such as at transmitters 110 as shown in FIG. 1. As shown in FIG. 23, incoming data 2305. 2307, such as, for example, position data, environmental data, message, identification information, and/or other data as described herein, may be provided to a data generator module 2310, where it may be processed and/or combined and provided to a forward error correction (FEC)/Encryption module 2315. A multiplexer 2325 may select either a pilot/preamble sequence, such as from pilot/preamble module 2320, or the data output from module 2315, and the output may then be applied to a data spreader 2330 (e.g., an exclusive or gate or other spreading circuit) where it may be spread by a spreading sequence, such as a sequence generated at a gold code generator module 2335, or other spreading sequence generation module. The output may then be applied to a transmit filter 2350 and separated into I and Q data components, rotated 90 degrees in rotator module 2355, applied to corresponding I and Q digital-to-analog converters (DACs) 2362, 2364, provided to a baseband filter 2370, an I/Q modulator 2375, and an RF output module 2380, where it may then be provided to an output power amplifier (PA) for transmission (not shown). A preamble selection multiplexer 2340 may be used to select an appropriate preamble.

As noted previously herein, QPSK modulation may be used for data transmission in some embodiments. QPSK modulation of the transmit signal, while using the same BPSK spreading and spectrum shaping filter, maintains the same peak-to-average ratio almost identically. As a result, there is no additional impact to the transmitter in terms of back-off (such as PA back-off) required to maintain the Out-Of-Band emission performance (which may be applicable for a QPSK spread sequence, for example). The ranging signal may be BPSK modulated with BPSK spreading (same as GPS), so that the GPS receiver can be re-used for acquisition and tracking of the WAPS ranging signal.

At the receiver/user device end, received QPSK data modulation may effect the receiver, such as if a GPS radio front end is used. With respect to acquisition and tracking for the data segments of the WAPS transmission, the GPS signal comprises BPSK spreading of a BPSK modulated data sequence. In order to facilitate re-use of the GPS/GNSS receiver baseband for the WAPS of an embodiment using QPSK, the QPSK modulated data may be spread using a BPSK spreading sequence. The acquisition processing block of a GNSS receiver can be re-used to process the WAPS signal, irrespective of whether it a software GPS receiver or a hardware GPS receiver, and irrespective of whether a linear or squared detector is used in the acquisition process. For the same raw SNR at the input to the acquisition block, the detection performance will be identical for QPSK modulation when compared with BPSK modulation. The GNSS tracking blocks can also be re-used with minor modifications. The GNSS data demodulation is generally performed in firmware or software so, with minor modifications to the frequency tracking loop to account for the QPSK data modulation, the WAPS data demodulation can be performed using the same processing capability.

A signaling method is further described below for WAPS that provides interference mitigation between transmitters, such as transmitters 110 as shown in FIG. 1, and improved data throughput. Positioning signals from transmitters comprise two portions of data, a first portion that is pulsed so as not to interfere with the transmission of other transmitters and a second portion that is on in a continuous manner which allows for improved data throughput and signal acquisition speed.

One problem that occurs in terrestrial systems, especially ones that operate in urban environments, is the problem of mutual interference. Another problem that can occur is the timeliness and the throughput of certain positioning data that allows the overall system to operate efficiently. Conventional positioning systems focus on one of three methods of transmission: code division multiple access (CDMA), time division multiple access (TDMA), and frequency division multiple access (FDMA). In CDMA transmitters typically operate concurrently and mutual interference is reduced by having different transmitters transmit distinct coded signals, which have low cross correlation properties. In TDMA, different transmitters are assigned different times of transmission, sometimes called "slots" and one and only one transmitter is permitted to transmit during a slot. In FDMA different transmitters are assigned different frequency passbands. Normally such passbands are disjoint although in orthogonal FDMA the passbands overlap somewhat. All such systems utilize time difference of arrival, or trilateration methods at receiving sites in order to determine their locations. The positioning information transmitted by the transmitters includes precision timing sequences, and positioning data, the latter including the location of transmitters, various timing corrections. The positioning data may be provided in a number of ways. For example, it may be modulated onto a coded timing sequence, it may be added or overlaid over the timing sequence, or it may be concatenated with the timing sequence.

The most common wide area positioning system is the Global Position Satellite System (GPS) which for the timing sequence employs a set of distinct pseudonoise sequences chosen among a set of Gold Codes of length 1023. As indicated above, in TDMA systems different transmitters are assigned slots and the transmitters only broadcast positioning data in their assigned slots, hence producing minimal mutual interference with their neighbors. As a result of the limited number of slots, there are locations where a receiver may still see simultaneous transmission, and often mutual interference is reduced in such cases by utilizing distinct codes for nearly transmitters that may transmit on the same slot.

Embodiments described herein may use transmitters transmitting on a continuous basis. However, certain portions of the positioning data may be sent at distinct times so as not to provide mutual interference. In an exemplary embodiment, the coded timing sequences are pulsed and at least a portion of the positioning information, such as transmitter location data, is broadcast by each transmitter in a continuous basis. In an exemplary embodiment, a portion of the positioning information broadcast continuously from each transmitter is simulcast, meaning the data is identical. Simulcast allows a rapid and reliable distribution of data such as transmitter identification and location. This in turn allows a receiving platform to rapidly synchronize itself to the network and determine the number of location of transmitters. Other data that may be included in such simulcasts include transmitter health data and user authorization data. In an exemplary embodiment, the sync signal may be broadcast simultaneously from all transmitters in the system enabling quick receiver synchronization to the network.

Unlike time slotted TDMA systems, embodiments described herein may have cross interference if the transmitters are continuously broadcasting positioning data. The continuously broadcast positioning data is received by receivers concurrently with precision timing data and other positioning data from a transmitter. This cross interference may be minimized by utilizing a narrowband format for the continuous positioning data. In this manner the continuous positioning data and the precision timing data may be separated by standard filtering methods. Nevertheless, a higher RF instantaneous dynamic range is used since, in many cases, the continuously received positioning data from one transmitter may be at a much higher level than the precision timing data.

As an example, consider a system which uses a repeat pattern of 7 transmitters. A particular transmitter, say transmitter A, broadcasts a repeating coded timing sequence of frame length 1023 at 1 megasymbols per second, but other embodiments may also be implemented. Each group of three frames may correspond to a data bit of information. These three repetitive frames may be integrated in order to produce a precision timing measurement. Low speed data may be incorporated on such a group of three frames by phase or differential phase modulation. Assume that 100 frames are transmitted by this transmitter and hence 33 bits of data, assuming biphase coding. This total period is 102.3 milliseconds in length. Concurrently, this transmitter transmits 1 symbol of data per repetition interval again by phase or differential phase modulation. At the end of this period of 102.3 msec, transmitter A ceases the transmission of the precision coded sequence but continues its transmission of positioning data. At this point another transmitter B begins a similar sequence. Of course transmitter B had been transmitting continuous positioning information during the period during which transmitter A was transmitting its precision timing data. The sequence continues in this manner.

In the above example each transmitter transmits at most 33 symbols of data via modulation of its coded sequence during a period of 0.72 seconds. However, the continuous transmission portion of the transmission from a given transmitter corresponds to 722 symbols of data. Assuming on average that a user receives signals from 4 transmitters, then the composite rate would only be 132 symbols if transmitters only transmitted during a particular period of 102.3 msec. Higher throughput of the continuous transmission may be achieved through the use of higher order modulation, such as differential quadraphase shift keying.

The various components, modules, and functions described herein can be located together or in separate locations. Communication paths couple the components and include any medium for communicating or transferring files among the components. The communication paths include wireless connections, wired connections, and hybrid wireless/wired connections. The communication paths also include couplings or connections to networks including local area networks (LANs), metropolitan area networks (MANs), wide area networks (WANs), proprietary networks, interoffice or backend networks, and the Internet. Furthermore, the communication paths include removable fixed mediums like floppy disks, hard disk drives, and CD-ROM disks, as well as flash RAM, Universal Serial Bus (USB) connections, RS-232 connections, telephone lines, buses, and electronic mail messages.

Aspects of the systems and methods described herein may be implemented as functionality programmed into any of a variety of circuitry, including programmable logic devices (PLDs), such as field programmable gate arrays (FPGAs), programmable array logic (PAL) devices, electrically programmable logic and memory devices and standard cell-based devices, as well as application specific integrated circuits (ASICs). Some other possibilities for implementing aspects of the systems and methods include: microcontrollers with memory (such as electronically erasable programmable read only memory (EEPROM)), embedded microprocessors, firmware, software, etc. Furthermore, aspects of the systems and methods may be embodied in microprocessors having software-based circuit emulation, discrete logic (sequential and combinatorial), custom devices, fuzzy (neural) logic, quantum devices, and hybrids of any of the above device types. The underlying device technologies may be provided in a variety of component types, e.g., metal-oxide semiconductor field-effect transistor (MOSFET) technologies like complementary metal-oxide semiconductor (CMOS), bipolar technologies like emitter-coupled logic (ECL), polymer technologies (e.g., silicon-conjugated polymer and metal-conjugated polymer-metal structures), mixed analog and digital, etc.

It should be noted that any system, method, and/or other components disclosed herein may be described using computer aided design tools and expressed (or represented), as data and/or instructions embodied in various computer-readable media, in terms of their behavioral, register transfer, logic component, transistor, layout geometries, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks via one or more data transfer protocols (e.g., HTTP, HTTPs, FTP, SMTP, WAP, etc.). When received within a computer system via one or more computer-readable media, such data and/or instruction-based expressions of the above described components may be processed by a processing entity (e.g., one or more processors) within the computer system in conjunction with execution of one or more other computer programs.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import, when used in this application, refer to this application as a whole and not to any particular portions of this application. When the word "or" is used in reference to a list of two or more items, that word covers all of the following interpretations of the word: any of the items in the list, all of the items in the list and any combination of the items in the list.

The above description of embodiments of the systems and methods is not intended to be exhaustive or to limit the systems and methods to the precise forms disclosed. While specific embodiments of, and examples for, the systems and methods are described herein for illustrative purposes, various equivalent modifications are possible within the scope of the systems and methods, as those skilled in the relevant art will recognize. The teachings of the systems and methods provided herein can be applied to other systems and methods, not only for the systems and methods described above. The elements and acts of the various embodiments described above can be combined to provide further embodiments. These and other changes can be made to the systems and methods in light of the above detailed description.

In one or more exemplary embodiments, the functions, methods and processes described may be implemented in whole or in part in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer.

By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure.

The various illustrative logical blocks, modules, processes, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps or stages of a method, process or algorithm in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the spirit or scope of the disclosure. Thus, the disclosure is not intended to be limited to the aspects shown herein but is to be accorded the widest scope consistent with the appended claims and their equivalents.

We claim:

1. A method of providing positioning system information, comprising:
   generating, at a transmitter, a range block including a ranging signal;
   sending, from the transmitter, the range block, wherein the range block is sent in a predefined slot of a plurality of predefined slots comprising a first transmit frame;
   generating, at the transmitter, a hybrid block including a positioning signal including positioning data;
   sending, from the transmitter, the hybrid block, wherein the hybrid block is sent in the predefined slot in a second transmit frame disjoint from the first transmit frame;
   generating, at a second transmitter, a range block including a ranging signal; and
   sending, from the second transmitter, the range block, wherein the range block is sent from the second transmitter in a second predefined slot of the plurality of predefined slots.

2. The method of claim 1, wherein the hybrid block further includes a ranging signal.

3. The method of claim 1, further comprising:
   generating, at the transmitter, a second hybrid block; and
   sending, from the transmitter, the second hybrid block, wherein the second hybrid block is sent in the predefined slot in a third transmit frame disjoint from the first and/or second transmit frames.

4. The method of claim 1, further comprising:
   generating, at the second transmitter, a hybrid block including a positioning signal including positioning data; and
   sending, from the second transmitter, the hybrid block, wherein the hybrid block is sent in the second predefined slot of the plurality of predefined slots in a transmit frame disjoint from the first transmit frame.

5. The method of claim 4, wherein the hybrid block generated at the second transmitter further includes a ranging signal.

6. The method of claim 4, further comprising:
   generating, at the second transmitter, a second hybrid block; and
   sending, from the second transmitter, the second hybrid block, wherein the second hybrid block is sent from the second transmitter in the second predefined slot in a transmit frame disjoint from the first transmit frame.

7. The method of claim 1, wherein the predefined slot is the same as the second predefined slot.

8. The method of claim 1, wherein the predefined slot is different than the second predefined slot.

9. The method of claim 1, wherein the ranging signal sent from the transmitter comprises a first random pseudo-noise (PRN) sequence and the ranging signal sent from the second transmitter comprises a second PRN sequence.

10. The method of claim 9, wherein the first PRN sequence is the same as the second PRN sequence.

11. The method of claim 9, wherein the first PRN sequence is different from the second PRN sequence.

12. The method of claim 1, wherein the ranging signal sent from the transmitter comprises a first frequency offset and the ranging signal sent from the second transmitter comprises a second frequency offset.

13. The method of claim 12, wherein the first frequency offset is the same as the second frequency offset.

14. The method of claim 12, wherein the first frequency offset is different from the second frequency offset.

15. The method of claim 1, wherein the range block sent from the second transmitter is sent in the first transmit frame.

16. The method of claim 1, wherein the range block sent from the transmitter includes a range preamble signal and a range pilot signal.

17. The method of claim 16, wherein the range block sent from the transmitter includes a guard signal.

18. The method of claim 17, wherein the guard signal comprises a gold code sequence.

19. The method of claim 17, wherein the guard signal comprises a blank or off signal.

20. The method of claim 16, wherein the hybrid block sent from the transmitter includes a hybrid preamble signal and the range preamble signal includes the hybrid preamble signal and an additional preamble signal.

21. The method of claim 1, wherein the hybrid block sent from the transmitter includes a hybrid preamble signal and a first set of data.

22. The method of claim 21, wherein the hybrid block sent from the transmitter further includes a hybrid pilot signal.

23. The method of claim 16, wherein the range preamble signal is sent with a first transmit frequency offset and the range pilot signal is sent with a second transmit frequency offset different from the first transmit frequency offset.

24. The method of claim 21, wherein the hybrid preamble signal is sent with a first transmit frequency offset and the first set of data is sent with a second transmit frequency offset different from the first transmit frequency offset.

25. The method of claim 1, wherein the hybrid block sent from the transmitter includes data associated with a location of the transmitter.

26. The method of claim 25, wherein the data associated with a location of the transmitter includes latitude and/or longitude data.

27. The method of claim 25, wherein the data associated with the location of the transmitter includes transmitter identification information.

28. The method of claim 25, wherein the data associated with the location of the transmitter includes altitude information.

29. The method of claim 1, wherein the hybrid block sent from the transmitter includes data associated with an environmental condition in the proximity of the transmitter.

30. The method of claim 29, wherein the data associated with an environmental condition includes pressure information.

31. The method of claim 29, wherein the data associated with an environmental condition includes temperature information.

32. The method of claim 1, wherein the transmitter hybrid block includes data associated with a reference time correction associated with the transmitter.

33. The method of claim 1, wherein the hybrid block sent from the transmitter includes data associated with a transmit quality metric associated with the transmitter.

34. The method of claim 1, wherein the hybrid block sent from the transmitter includes data associated with a packet type of the hybrid block.

35. The method of claim 1, wherein the hybrid block sent from the transmitter includes encrypted data.

36. The method of claim 1, wherein the hybrid block sent from the transmitter includes data with error control coding.

37. The method of claim 36, wherein the error control coding comprises convolutional encoding.

38. The method of claim 1, wherein the hybrid block sent from the transmitter includes cyclical redundant checking (CRC) data.

39. The method of claim 1, wherein range block sent from the transmitter includes a preamble and a transmitter sequence encoded with a first spreading code and the range block sent from the second transmitter includes the preamble and a second transmitter sequence encoded with a second spreading code different from the first spreading code.

40. The method of claim 39, wherein the first and second spreading codes are different Gold codes.

41. The method of claim 1, wherein the first transmit frame has a duration of one second and the plurality of predefined slots consists of ten slots.

42. The method of claim 41, wherein the first transmit frame is sent using binary phase shift keying (BPSK).

43. The method of claim 41, wherein the first transmit frame is sent using quadrature phase shift keying (QPSK).

44. The method of claim 1, wherein the hybrid block sent from the transmitter comprises a plurality of data symbols.

45. The method of claim 44, wherein the plurality of data symbols consists of ninety nine data symbols.

46. The method of claim 44, wherein the hybrid block further includes a guard signal.

47. The method of claim 46, wherein the guard signal is a blank or off signal.

48. The method of claim 44, wherein the hybrid block includes a preamble and wherein the preamble consists of seven symbols.

49. A method of providing positioning system information, comprising:
    generating, at a transmitter, a range block including a ranging signal;
    sending, from the transmitter, the range block, wherein the range block is sent in a predefined slot of a plurality of predefined slots comprising a first transmit frame;
    generating, at the transmitter, a hybrid block including a positioning signal including positioning data;
    sending, from the transmitter, the hybrid block, wherein the hybrid block is sent in the predefined slot in a second transmit frame disjoint from the first transmit frame;
    generating, at the transmitter, a second hybrid block; and
    sending, from the transmitter, the second hybrid block, wherein the second hybrid block is sent in the predefined slot in a third transmit frame disjoint from the first and/or second transmit frames,
    wherein the hybrid block sent from the transmitter includes a first portion of data associated with a transmitter parameter and the second hybrid block includes a second portion of data associated with the transmitter parameter.

50. The method of claim 49, wherein the first portion of data represents a first lowered resolution value of the transmitter parameter and the second portion of data represents a second lowered resolution value of the transmitter parameter.

51. The method of claim 50, wherein the first lowered resolution value and the second lowered resolution value are different lowered resolution values.

52. The method of claim 50, wherein the first lowered resolution value and the second lowered resolution value are selected so as to be usable in combination to generate a higher resolution value at a receiver.

53. The method of claim 49, wherein the transmitter parameter is a position value.

54. The method of claim 49, wherein the position value is a longitude value.

55. The method of claim 49, wherein the position value is a latitude value.

56. The method of claim 49, wherein the position value is an altitude value.

57. The method of claim 49, wherein the transmitter parameter is a temperature value.

58. The method of claim 49, wherein the transmitter parameter is a pressure value.

59. The method of claim 1, wherein the transmitter and the second transmitter are time synchronized using GPS or another radio timing system.

60. A transmitter network for providing positioning information, comprising:
    one or more processing elements that generate a first range block including a first ranging signal, a hybrid block including a positioning signal including positioning data, and a second range block including a second ranging signal;
    a first transmitter that transmits the first range block in a predefined slot of a plurality of predefined slots comprising a first transmit frame, and that transmits the hybrid block in the predefined slot in a second transmit frame disjoint from the first transmit frame; and a second transmitter that transmits the second range block in a second predefined slot of the plurality of predefined slots.

61. A transmitter network comprising:

means for generating a range block including a ranging signal;

means for sending the range block, wherein the range block is sent in a predefined slot of a plurality of predefined slots comprising a first transmit frame;

means for generating a hybrid block including a positioning signal including positioning data;

means for sending the hybrid block, wherein the hybrid block is sent in the predefined slot in a second transmit frame disjoint from the first transmit frame;

means for generating a second range block including a ranging signal; and means for sending the second range block in a second predefined slot of the plurality of predefined slots.

62. A non-transitory processor-readable medium including instructions adapted to be executed by a computer to implement a method comprising:

generating a range block including a ranging signal;

initiating transmission of the range block from a first transmitter, wherein the range block is transmitted in a predefined slot of a plurality of predefined slots comprising a first transmit frame;

generating a hybrid block including a positioning signal including positioning data; and initiating transmission of the hybrid block from the first transmitter, wherein the hybrid block is transmitted in the predefined slot in a second transmit frame disjoint from the first transmit frame;

generating a second range block including a ranging signal; and initiating transmission of the second range block from a second transmitter, wherein the second range block is transmitted in a second predefined slot of the plurality of predefined slots.

* * * * *